(12) United States Patent
Zhang et al.

(10) Patent No.: US 11,749,217 B2
(45) Date of Patent: Sep. 5, 2023

(54) LIGHT-EMITTING SUBSTRATE AND METHOD FOR MANUFACTURING THE SAME, LIGHT-EMITTING APPARATUS AND DISPLAY APPARATUS

(71) Applicants: HEFEI XiNSHENG OPTOELECTRONICS TECHNOLOGY CO., LTD., Anhui (CN); BOE TECHNOLOGY GROUP CO., LTD., Beijing (CN)

(72) Inventors: Tianyu Zhang, Beijing (CN); Min He, Beijing (CN); Tengfei Zhong, Beijing (CN); Xiaodong Xie, Beijing (CN); Xinxiu Zhang, Beijing (CN); Xue Zhao, Beijing (CN); Huayu Sang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 11 days.

(21) Appl. No.: 17/486,624

(22) Filed: Sep. 27, 2021

(65) Prior Publication Data
US 2022/0101801 A1    Mar. 31, 2022

(30) Foreign Application Priority Data
Sep. 27, 2020  (CN) .......................... 202011032315.6

(51) Int. Cl.
*G09G 3/34*  (2006.01)
(52) U.S. Cl.
CPC ..... *G09G 3/342* (2013.01); *G09G 2300/0426* (2013.01); *G09G 2330/028* (2013.01)

(58) Field of Classification Search
CPC ............ G09G 3/342; G09G 2330/028; G09G 2300/0426; G09G 3/34; H01L 33/62;
(Continued)

(56) References Cited

U.S. PATENT DOCUMENTS 7,880,190 B2 *  2/2011  Ogihara ..................... B41J 2/45
                                                         257/E31.127
10,593,852 B2 *  3/2020  Chen ........................ H01L 33/06
(Continued)

FOREIGN PATENT DOCUMENTS

CN    108803131 A    11/2018
CN    109116626 A    1/2019
(Continued)

OTHER PUBLICATIONS

Office Action for the Chinese Patent Application No. 202011032315.6 issued by the Chinese Patent Office dated Oct. 24, 2022.

*Primary Examiner* — Olga V Merkoulova
(74) *Attorney, Agent, or Firm* — IP & T GROUP LLP

(57) ABSTRACT

A light-emitting substrate includes a base and a plurality of light-emitting units disposed on the base. A light-emitting unit includes a driving voltage terminal, and a main driver chip pad group, a plurality of main light-emitting element pad groups connected in series and at least one spare light-emitting element pad group. Both ends of the plurality of main light-emitting element pad groups are coupled to the driving voltage terminal and the main driver chip pad group. Each spare light-emitting element pad group is connected in parallel with one of the plurality of main light-emitting element pad groups to constitute a pad unit.

19 Claims, 21 Drawing Sheets

(58) Field of Classification Search
CPC ....... H01L 25/13; H01L 33/06; H01L 33/505; H01L 33/58
See application file for complete search history.

(56) References Cited

U.S. PATENT DOCUMENTS

| | | | |
|---|---|---|---|
| 10,714,668 B2* | 7/2020 | Lee | H01L 33/62 |
| 11,227,984 B2* | 1/2022 | Chen | H01L 33/62 |
| 2005/0057641 A1* | 3/2005 | Ogihara | H01L 25/167 257/E25.032 |
| 2009/0161039 A1* | 6/2009 | Toyama | G02F 1/133603 313/499 |
| 2011/0310590 A1* | 12/2011 | Yamashita | G02F 1/133609 362/249.02 |
| 2012/0256814 A1* | 10/2012 | Ootorii | G09G 3/3208 345/82 |
| 2018/0174973 A1* | 6/2018 | Aoyagi | H01L 25/167 |
| 2019/0294273 A1 | 9/2019 | Yoshida | |
| 2019/0393389 A1* | 12/2019 | Chen | H01L 33/58 |
| 2020/0025997 A1 | 1/2020 | Lu et al. | |
| 2020/0035147 A1* | 1/2020 | Ban | G09G 3/32 |
| 2020/0074917 A1 | 3/2020 | Li et al. | |
| 2020/0176658 A1* | 6/2020 | Chen | H01L 25/13 |
| 2022/0223775 A1 | 7/2022 | Liu et al. | |

FOREIGN PATENT DOCUMENTS

| | | | |
|---|---|---|---|
| CN | 110740570 A | 1/2020 | |
| CN | 110853531 A | 2/2020 | |

\* cited by examiner

D-D'

E-E'

LIGHT-EMITTING SUBSTRATE AND METHOD FOR MANUFACTURING THE SAME, LIGHT-EMITTING APPARATUS AND DISPLAY APPARATUS

CROSS-REFERENCE TO RELATED APPLICATION

This application claims priority to Chinese Patent Application No. 202011032315.6, filed on Sep. 27, 2020, which is incorporated herein by reference in its entirety.

TECHNICAL FIELD

The present disclosure relates to the field of display technologies, and in particular, to a light-emitting substrate and a method for manufacturing the same, a light-emitting apparatus and a display apparatus.

BACKGROUND

With the development of light-emitting diode (LED) technology, a backlight source (also referred to as a backlight module) using micro LEDs has been widely used. Therefore, not only can an image contrast of, for example, a transmissive display product using the backlight source reach a level of an organic light-emitting diode (OLED) display product, but also the product can retain technical advantages of a liquid crystal display (LCD). As a result, a display effect of an image may be improved, and excellent visual experience may be provided for users.

SUMMARY

In an aspect, a light-emitting substrate is provided. The light-emitting substrate includes a base and a plurality of light-emitting units disposed on the base. A light-emitting unit includes a driving voltage terminal, a main driver chip pad group, a plurality of main light-emitting element pad groups connected in series, and at least one spare light-emitting element pad group. Both ends of the plurality of main light-emitting element pad groups are coupled to the driving voltage terminal and the main driver chip pad group. Each spare light-emitting element pad group is connected in parallel with one of the plurality of main light-emitting element pad groups to constitute a pad unit.

In some embodiments, the at least one spare light-emitting element pad group includes a plurality of spare light-emitting element pad groups, and the plurality of spare light-emitting element pad groups and respective main light-emitting element pad groups connected in parallel therewith constitute a plurality of pad units.

In some embodiments, according to a connection sequence of the plurality of pad units in the light-emitting unit, in two adjacent pad units, a distance between two main light-emitting element pad groups and a distance between two spare light-emitting element pad groups are approximately equal.

In some embodiments, a main light-emitting element pad group includes an anode pad and a cathode pad arranged in a first direction, and a spare light-emitting element pad group includes an anode pad and a cathode pad arranged in the first direction. In the pad unit, the anode pads in the spare light-emitting element pad group and the main light-emitting element pad group are arranged in a second direction, and the cathode pads in the spare light-emitting element pad group and the main light-emitting element pad group are arranged in the second direction. The second direction intersects with the first direction.

In some embodiments, the light-emitting unit further includes a plurality of first lines. The plurality of first lines are disposed between the driving voltage terminal and the main driver chip pad group, and sequentially connect the plurality of main light-emitting element pad groups. The plurality of first lines include two first lines connected to the main light-emitting element pad group in the pad unit. The two first lines are a first connection line and a second connection line. The main light-emitting element pad group and the spare light-emitting element pad group in the pad unit each includes an anode and a cathode, the anode pads of the spare light-emitting element pad group and the main light-emitting element pad group are both disposed on the first connection line, and the cathode pads of the spare light-emitting element pad group and the main light-emitting element pad group are both disposed on the second connection line.

In some embodiments, in the pad unit, the anode pads of the main light-emitting element pad group and the spare light-emitting element pad group are both disposed at an end of the first connection line, and the end of the first connection line extends from an anode pad to another anode pad in the pad unit. And/or, in the pad unit, the cathode pads of the main light-emitting element pad group and the spare light-emitting element pad group are both disposed at an end of the second connection line, and the end of the second connection line extends from a cathode pad to another cathode pad in the pad unit.

In some embodiments, an end of the first connection line is divided into a first pattern and a second pattern that are sequentially arranged in an extension direction of the end of the first connection line, a width of the second pattern is greater than a width of the first pattern, each of the widths of the first pattern and the second pattern is a dimension of the first pattern and the second pattern in a direction perpendicular to the extension direction of the end of the first connection line. The anode pads of the spare light-emitting element pad group and the main light-emitting element pad group in the pad unit are both disposed on the second pattern, an arrangement direction thereof is substantially perpendicular to the extension direction of the end of the first connection line, and they are located on both sides of a center line of the first pattern. The center line of the first pattern is parallel to the extension direction of the end of the first connection line, and is at a same distance from the two side faces of the first pattern. And/or, an end of the second connection line is divided into a third pattern and a fourth pattern that are sequentially arranged in an extension direction of the end of the second connection line, a width of the fourth pattern is greater than a width of the third pattern, each of the widths of the third pattern and the fourth pattern is a dimension of the third pattern and the fourth pattern in a direction perpendicular to the extension direction of the end of the second connection line. The cathode pads of the spare light-emitting element pad group and the main light-emitting element pad group in the pad unit are both disposed on the fourth pattern, an arrangement direction thereof is substantially perpendicular to the extension direction of the end of the second connection line, and they are located on both sides of a center line of the third pattern. The center line of the third pattern is parallel to the extension direction of the end of the second connection line, and is at a same distance from the two side faces of the third pattern.

In some embodiments, the end of the first connection line is divided into the first pattern and the second pattern that are sequentially arranged in the extension direction of the end of the first connection line, the width of the second pattern is greater than the width of the first pattern, each of the widths of the first pattern and the second pattern is the dimension of the first pattern and the second pattern in a direction perpendicular to the extension direction of the end of the first connection line. The anode pads of the spare light-emitting element pad group and the main light-emitting element pad group in the pad unit are both disposed on the second pattern, the arrangement direction thereof is substantially perpendicular to the extension direction of the end of the first connection line, and they are located on both sides of the center line of the first pattern. The center line of the first pattern is parallel to the extension direction of the end of the first connection line, and is at a same distance from the two side faces of the first pattern. The anode pads of the spare light-emitting element pad group and the main light-emitting element pad group in the pad unit are symmetrically arranged with respect to the center line of the first pattern.

In some embodiments, the end of the second connection line is divided into the third pattern and the fourth pattern that are sequentially arranged in the extension direction of the end of the second connection line, the width of the fourth pattern is greater than the width of the third pattern, each of the widths of the third pattern and the fourth pattern is a dimension of the third pattern and the fourth pattern in the direction perpendicular to the extension direction of the end of the second connection line. The cathode pads of the spare light-emitting element pad group and the main light-emitting element pad group in the pad unit are both disposed on the fourth pattern, the arrangement direction thereof is substantially perpendicular to the extension direction of the end of the second connection line, and they are located on both sides of the center line of the third pattern. The center line of the third pattern is parallel to the extension direction of the end of the second connection line, and is at a same distance from the two side faces of the third pattern. The cathode pads of the spare light-emitting element pad group and the main light-emitting element pad group in the pad unit are symmetrically arranged with respect to the center line of the third pattern.

In some embodiments, the light-emitting substrate further includes at least one first support pad. A first support pad is located on a side of the pad unit close to the base, and includes two first sub-patterns separated from each other. In the pad unit, an orthogonal projection of the main light-emitting element pad group on the base is within an orthogonal projection of a first sub-pattern in the first support pad on the base, and an orthogonal projection of the spare light-emitting element pad group on the base is within an orthogonal projection of another first sub-pattern in the first support pad on the base. Or, the light-emitting substrate further includes at least one second support pad. A second support pad is located on a side of the pad unit close to the base, and includes a plurality of second sub-patterns separated from each other. In the pad unit, orthogonal projections of pads included in the main light-emitting element pad group and the spare light-emitting element pad group on the base are within orthogonal projections of the plurality of second sub-patterns on the base in one-to-one correspondence.

In some embodiments, the light-emitting unit further includes a spare driver chip pad group. The main driver chip pad group and the spare driver chip pad group are connected in parallel.

In some embodiments, the light-emitting substrate further includes at least one source address line, at least one source voltage line, at least one driving voltage line, and at least one common voltage line. A driving voltage line is coupled to the driving voltage terminal. In the light-emitting unit, the main driver chip pad group and the spare driver chip pad group each include a first input pad, a second input pad, an output pad, and a common voltage pad. In the main driver chip pad group and the spare driver chip pad group, two first input pads are both coupled to a source address line or output pads of another light-emitting unit, two second input pads are both coupled to a source voltage line, two output pads are both coupled to the main light-emitting element pad group of the light-emitting unit and first input pads of the another light-emitting unit, and two common voltage pads are both coupled to a common voltage line.

In some embodiments, the at least one source address line includes a plurality of source address lines. The plurality of light-emitting units constitute a plurality of light-emitting unit groups, and a light-emitting unit group includes at least two light-emitting units and a plurality of second lines. In the light-emitting unit group, main driver chip pad groups are sequentially connected in series through the plurality of second lines, and according to a sequence of the serial connection, except a last main driver chip pad group, an output pad of each remaining main driver chip pad group is coupled to a first input pad of a next main driver chip pad group. A first input pad of a first main driver chip pad group is coupled to a source address line.

In some embodiments, the plurality of light-emitting units are arranged in N rows and M columns, and the light-emitting units in each light-emitting unit group are arranged in K1 rows and K2 columns. N is an integer greater than 0, M is an integer greater than 0, K1 is greater than 0 and is less than or equal to N, and K1 is an integer, K2 is greater than 0 and is less than or equal to M, and K2 is an integer.

In some embodiments, the at least one source address line, the at least one source voltage line, the at least one driving voltage line, and the at least one common voltage line are located in a first conductive layer. The main light-emitting element pad group, the spare light-emitting element pad group, the main driver chip pad group, and the spare driver chip pad group are located in a second conductive layer. The first conductive layer is closer to the base than the second conductive layer.

In some embodiments, the light-emitting substrate further includes at least one third support pad. A third support pad is located on a side of the main driver chip pad group or the spare driver chip pad group close to the base, and includes a plurality of third sub-patterns separated from each other. Orthogonal projections of pads included in the main driver chip pad group or the spare driver chip pad group on the base are within orthogonal projections of the third sub-patterns in the third support pad on the base in one-to-one correspondence.

In some embodiments, the main driver chip pad group is a main display driver integrated circuit (DDIC) pad group, the main light-emitting element pad group is a main light-emitting diode (LED) pad group, and the spare light-emitting element pad group is a spare LED pad group.

In another aspect, a light-emitting apparatus is provided. The light-emitting apparatus includes the light-emitting substrate according to any one of the above embodiments and a plurality of light-emitting elements disposed on the light-emitting substrate. Each light-emitting element is coupled to a main light-emitting element pad group or a spare light-emitting element pad group on the light-emitting substrate.

In yet another aspect, a display apparatus is provided. The display apparatus includes a display panel and the light-emitting apparatus according to any one of the above embodiments. The light-emitting apparatus is located on a side of the display panel facing away from a display surface.

In yet another aspect, a method for manufacturing a light-emitting substrate is provided. The method for manufacturing the light-emitting substrate includes: providing a plurality of light-emitting units on a base. A light-emitting unit includes a driving voltage terminal, a main driver chip pad group, a plurality of main light-emitting element pad groups connected in series, and at least one spare light-emitting element pad group; both ends of the plurality of main light-emitting element pad groups are coupled to the driving voltage terminal and the main driver chip pad group; each spare light-emitting element pad group is connected in parallel with one of the plurality of main light-emitting element pad groups to constitute a pad unit.

BRIEF DESCRIPTION OF THE DRAWINGS

In order to describe technical solutions in embodiments of the present disclosure or the prior art more clearly, accompanying drawings to be used in the description of the embodiments or the prior art will be introduced briefly. However, the accompanying drawings to be described below are merely some embodiments of the present invention, and a person of ordinary skill in the art may obtain other drawings according to these drawings without paying any creative effort.

DETAILED DESCRIPTION

Figure 1:
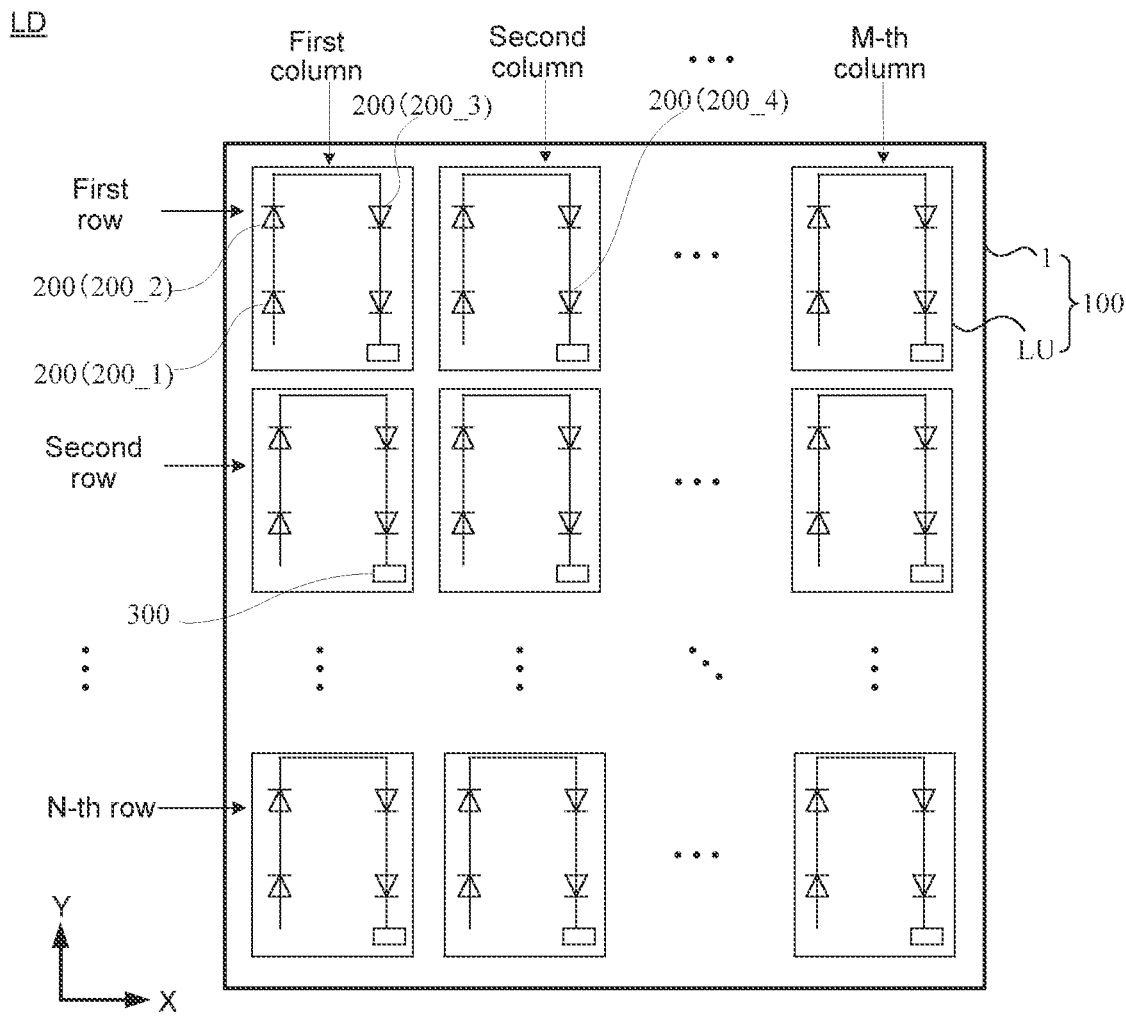
FIG. 1 is a schematic diagram showing a structure of a light-emitting apparatus, in accordance with embodiments of the present disclosure.

The technical solutions in the embodiments of the present disclosure will be described clearly and completely with reference to the accompanying drawings in the embodiments of the present disclosure below. However, the described embodiments are merely some but not all embodiments of the present disclosure. All other embodiments obtained by a person of ordinary skill in the art based on the embodiments of the present disclosure shall be included in the protection scope of the present disclosure.

In the description of the present disclosure, it will be understood that, orientations or positional relationships indicated by the terms "center", "upper", "lower", "front", "rear", "left", "right", "vertical", "horizontal", "top", "bottom", "inner", "outer", etc. are based on orientations or positional relationships shown in the drawings, merely to facilitate and simplify the description of the present disclosure, but not to indicate or imply that the referred devices or elements must have a particular orientation, or must be constructed or operated in a particular orientation. Therefore, these terms cannot be construed as limitations on the present disclosure.

The terms such as "first", "second" and the like are used for descriptive purposes only, and are not to be construed as indicating or implying the relative importance or implicitly indicating the number of indicated technical features. Thus, features defined as "first", "second" and the like may explicitly or implicitly include one or more of the features. In the description of the present disclosure, the term "a plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The use of the phrase "applicable to" or "configured to" herein means an open and inclusive language, which does not exclude devices that are applicable to or configured to perform additional tasks or steps.

In addition, the use of the phrase "based on" or "according to" is meant to be open and inclusive, since a process, step, calculation or other action that is "based on" or "according to" one or more of the stated conditions or values may, in practice, be based on additional conditions or values exceeding those stated.

In the description herein, the terms "installed", "connected" and "connection" should be understood in a broad sense unless otherwise specifically stated and limited. For example, it may be a fixed connection, a detachable connection or an integral connection; it may be a direct connection, an indirect connection through an intermediate medium, or an internal connection between two elements. Specific meanings of the above terms in the present disclosure may be understood by a person of ordinary skill in the art according to specific conditions.

The term such as "about", "substantially" or "approximately" as used herein includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable range of deviation of a particular value. The acceptable range of deviation is determined by a person of ordinary skill in the art in view of the measurement in question and the errors associated with the measurement of the particular quantity (i.e., the limitations of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; the term "equal" includes absolute equality and approximate equality, and an acceptable range of deviation of the approximate equality may be, for example, a difference between two equals of less than or equal to 5% of either of the two equals.

Exemplary embodiments are described herein with reference to sectional views and/or plan views as idealized exemplary drawings. In the accompanying drawings, thicknesses of layers and regions are enlarged for clarity. Thus, variations in shapes relative to the accompanying drawings due to, for example, manufacturing technologies and/or tolerances may be envisaged. Therefore, the exemplary embodiments should not be construed to be limited to the shapes of the regions shown herein, but to include deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Micro light-emitting diodes (Micro LEDs) have a small size and high brightness, and may be used in a backlight module of a display apparatus in a large number. Moreover, the Micro LEDs may finely adjust backlight to achieve display of images with a high dynamic range (HDR). In a lamp panel including a plurality of Micro LEDs, no matter which Micro LED fails to emit light normally due to damage or poor contact with a pad, the lamp panel is determined as a defective product, which causes a large cost loss. Although a manufacturing process of the lamp panel includes a rework process, it cannot be guaranteed that pads coupled to (e.g., bonded to or in contact with) the Micro LEDs are not damaged in the rework process. Once the pads are damaged, even if new Micro LEDs are installed by reusing a die bonding process, poor bonding or contact between the Micro LEDs and the pads may also be caused, and performance of the lamp panel may still be affected.

In order to solve the problem of poor bonding or contact between light-emitting elements (e.g., the Micro LEDs) and the pads due to the damage of the pads, some embodiments of the present disclosure provide a light-emitting apparatus. The light-emitting apparatus is a product capable of emitting light. In some possible implementations, the light-emitting apparatus may be used for illumination, and may be, for example, a lamp panel or a backlight module. The backlight module may include a lamp panel, an optical film disposed on a light exit side of the lamp panel, a plastic frame, and a reflective sheet. In some other possible implementations, the light-emitting apparatus may be used to display images, and may be, for example, a decorative wall or a traffic light.

As shown in FIG. 1, the light-emitting apparatus LD includes a light-emitting substrate 100 and a plurality of light-emitting elements 200.

Furthermore, the light-emitting apparatus LD may further include at least one (i.e., one or a plurality of) driver chips 300. FIG. 1 shows an example in which the light-emitting apparatus LD includes a plurality of driver chips 300.

The light-emitting elements 200 are elements capable of emitting light after being energized. They are disposed on the light-emitting substrate 100 and are coupled to the light-emitting substrate 100. For example, the light-emitting elements 200 may be LEDs, Micro LEDs, organic light-emitting diodes (OLEDs), or quantum dot light-emitting diodes (QLEDs), which is not limited in the embodiments of the present disclosure. As an example, the light-emitting elements 200 may be micro light-emitting devices, and a size of each micro light-emitting device may be referred to a size of a micro LED. A micro LED includes a light-emitting diode on an order of sub-millimeters or even microns, and may further include a light-emitting diode with a smaller size. The light-emitting diode on the order of sub-millimeters is also referred to as a mini light-emitting diode (Mini LED), and a size (e.g., a length) of the Mini LED may be in a range of 50 micrometers to 150 micrometers, and may be in a range of, for example, 80 micrometers to 120 micrometers. The light-emitting diode on the order of microns is also referred to as a micro light-emitting diode (Micro LED), and a size (e.g., a length) of the Micro LED may be less than 50 micrometers, and may be in a range of, for example, 10 micrometers to 50 micrometers.

In some embodiments, the light-emitting substrate 100 includes a base 1 and a plurality of light-emitting units LU disposed on the base 1.

The base 1 may be set as needed. For example, the base 1 may be a rigid base. The rigid base may be made of glass, polymethyl methacrylate (PMMA) or the like. For another example, the base 1 may be a flexible base. The flexible base may be made of polyethylene terephthalate (PET), polyethylene naphthalate two formic acid glycol ester (PEN), ultra-thin glass, polyimide (PI) or the like.

In some embodiments, the plurality of light-emitting units LU may be arranged in an array. For example, they are arranged in N rows and M columns, N is an integer greater than 0, and M is an integer greater than 0. For example, N is greater than or equal to 2 (N≥2), and M is greater than or equal to 2 (M≥2). In FIG. 1, X represents a row direction, and Y represents a column direction. The x direction and the y direction are both parallel to a plane where the light-emitting substrate 100 is located. That is, they are both perpendicular to a thickness direction of the light-emitting substrate 100, and they intersect with each other. For example, the X direction and the Y direction are perpendicular to each other. Each light-emitting unit LU may be coupled to at least two light-emitting elements 200. For example, each light-emitting unit LU is configured to connect at least two light-emitting elements 200 in series. FIG. 1 shows an example in which a light-emitting unit LU connects four light-emitting elements 200_1, 200_2, 200_3 and 200_4 in series. In these embodiments, since the light-emitting unit LU itself does not emit light and is coupled to the light-emitting elements 200, the light-emitting unit LU may also be referred to as a light-emitting element coupling unit.

In some other embodiments, the plurality of light-emitting units LU may be arranged in any other way. For example, they are arranged according to a desired display pattern, and the arrangement is not limited to a matrix arrangement.

The driver chips 300 may be disposed on the light-emitting substrate 100, and are coupled to the light-emitting substrate 100. A (e.g., each) driver chip 300 is coupled to a light-emitting unit LU. For example, the driver chip 300 may be coupled to at least two light-emitting elements 200 through a light-emitting unit LU. The driver chip 300 is configured to provide driving signals to the light-emitting elements 200, so as to drive the light-emitting elements 200 to emit light. For example, the driver chip 300 may be a display driver integrated circuit (DDIC).

Hereinafter, the light-emitting unit LU in the light-emitting substrate 100 will be described in detail.

Figure 2A:
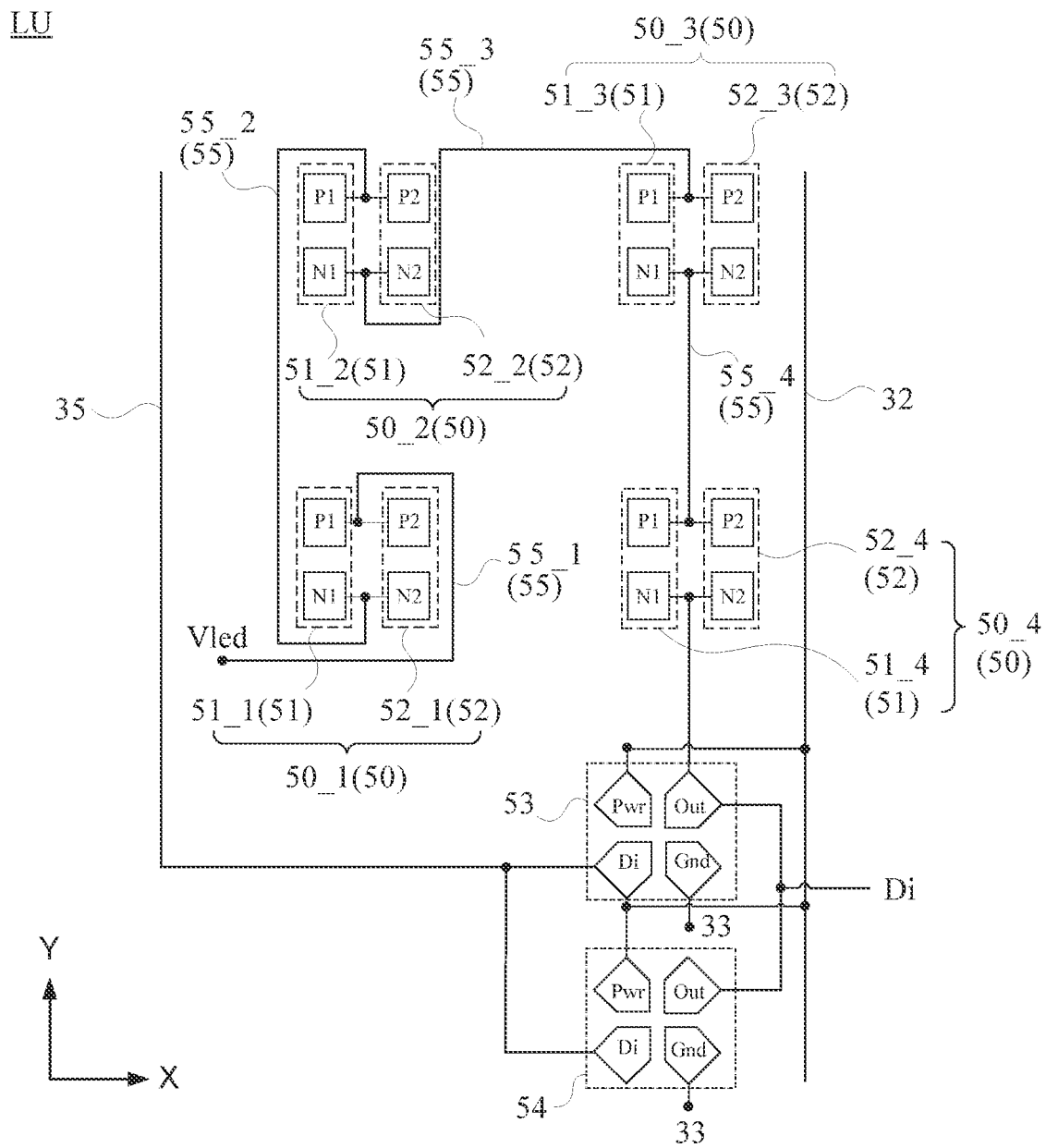
FIG. 2A is a connection diagram among components included in a light-emitting unit, in accordance with embodiments of the present disclosure.
Figure 2B:
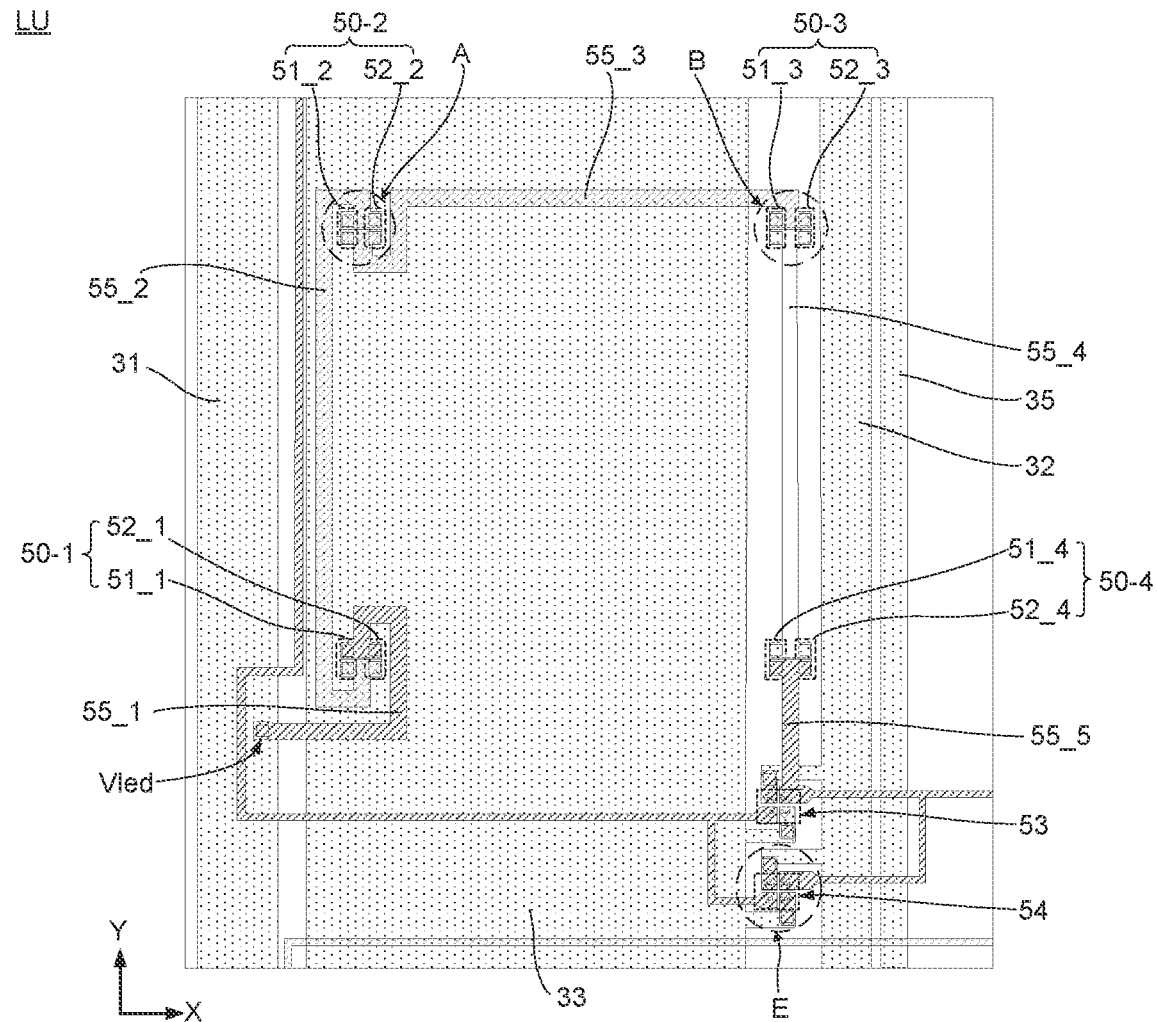
FIG. 2B is a top view of a light-emitting unit, in accordance with embodiments of the present disclosure.

FIG. 2A is a connection diagram among components included in a light-emitting unit, and FIG. 2B is a top view of a light-emitting unit. As shown in FIGS. 2A and 2B, a (e.g., each) light-emitting unit LU includes a driving voltage terminal Vled, a main driver chip pad group 53, a main light-emitting module, and a spare light-emitting module.

The driving voltage terminal Vled is configured to provide a driving voltage. For example, when a plurality of (i.e., at least two, e.g., four) light-emitting elements coupled to the light-emitting unit LU need to emit light, the driving voltage terminal Vled provides a high voltage.

The main driver chip pad group 53 is configured to be coupled to the driver chip 300 to receive the driving signals emitted by the driver chip 300. For example, when the plurality of light-emitting elements 200 coupled to the light-emitting unit LU need to emit light, the driver chip 300 provides a driving signal to the light-emitting elements through the main driver chip pad group 53, so as to control a driving current flowing through the light-emitting elements.

The main light-emitting module includes a plurality of main light-emitting element pad groups 51 connected in series. Both ends of the main light-emitting module (i.e., both ends of the plurality of main light-emitting element pad groups 51) are coupled to the driving voltage terminal Vled and the main driver chip pad group 53, so that the plurality of light-emitting elements 200 coupled to the light-emitting unit LU may be connected in series.

For example, each main light-emitting element pad group 51 includes an anode pad P1 and a cathode pad N1. The light-emitting unit LU includes four main light-emitting element pad groups 51_1, 51_2, 51_3 and 51_4, which are connected in series through respective anode pads P1 and cathode pads N1. An anode pad P1 of the main light-emitting element pad group 51_1 (i.e., an anode pad P1 at an end of the main light-emitting module) is coupled to the driving voltage terminal Vled, and a cathode pad N1 of the main light-emitting element pad group 514 (i.e., a cathode pad N1 at the other end of the main light-emitting module) is coupled to the main driver chip pad group 53.

In addition, the number of the main light-emitting element pad groups 51 in each light-emitting unit LU is not limited, and may be set as needed. For example, the number is two, four, five or eight. The main light-emitting element pad groups 51 in each light-emitting unit LU may be arranged in an array (e.g., arranged in a matrix). Of course, the main light-emitting element pad groups 51 in each light-emitting unit LU may also be arranged as needed, for example, they are arranged in a circle.

The spare light-emitting module includes at least one (i.e., one or a plurality of) spare light-emitting element pad groups 52. In the light-emitting unit LU, each spare light-emitting element pad group 52 is connected in parallel with one of the plurality of main light-emitting element pad groups 51 to constitute a pad unit (also referred to as a die bonding unit) 50. in a case where the spare light-emitting module includes a plurality of spare light-emitting element pad groups 52, each of the plurality of spare light-emitting element pad groups 52 and a respective main light-emitting element pad groups 51 connected in parallel therewith constitute a pad units 50. The number of the spare light-emitting element pad groups 52 in each light-emitting unit LU is not limited in the embodiments of the present disclosure, and may be set as needed. For example, the number is one, two, four, five or eight.

In some examples, in the light-emitting unit LU, the number of the spare light-emitting element pad groups 52 is equal to the number of the main light-emitting element pad groups 51, and the plurality of spare light-emitting element pad groups 52 are connected in parallel with the plurality of main light-emitting element pad groups 51 in one-to-one correspondence. For example, as shown in FIG. 2A, each spare light-emitting element pad group 52 includes an anode pad P2 and a cathode pad N2. The light-emitting unit LU includes four spare light-emitting element pad groups 52_1, 52_2, 52_3 and 52_4, which are connected in parallel with the four main light-emitting element pad groups 51_1, 51_2, 51_3 and 51_4 in one-to-one correspondence to constitute four pad units 50_1, 50_2, 50_3 and 50_4. For example, in the same pad unit 50, the spare light-emitting element pad group 52_1 is connected in parallel with the main light-emitting element pad group 51_1, that is, an anode pad P2 of the spare light-emitting element pad group 52_1 is coupled to the anode pad P1 of the main light-emitting element pad group 51_1, and a cathode pad N2 of the spare light-emitting element pad group 52_1 is coupled to a cathode pad N1 of the main light-emitting element pad group 51_1; for a parallel arrangement of other spare light-emitting element pad groups and other main light-emitting unit pad groups, it is the same as the above arrangement, and details will not be repeated herein.

In this case, there is a respective spare light-emitting element pad group 52 for each of all main light-emitting element pad groups 51 in the main light-emitting module. In this way, in a case where any main light-emitting element pad group 51 in the light-emitting unit LU is damaged and cannot be repaired, a light-emitting element 200 may be installed on a spare light-emitting element pad group 52 corresponding to the main light-emitting element pad group 51, so that repairability of the light-emitting apparatus may be improved, and a yield of the product may be improved.

in some other examples, in the light-emitting unit LU, the number of the spare light-emitting element pad groups 52 is not equal to the number of the main light-emitting element pad groups 51. For example, the light-emitting unit LU may include a part of the four spare light-emitting element pad groups 52, e.g., two spare light-emitting element pad groups 52_1 and 52_2, that is, the spare light-emitting element pad groups 52_3 and 52_4 are not provided, so that only two pad units 50 are constituted in the light-emitting unit LU, that is, the spare light-emitting element pad groups 52_1 and the main light-emitting element pad groups 51-1 are constitute one pad unit 50_1, and the spare light-emitting element pad groups 52_2 and the main light-emitting element pad groups 51-2 are constitute the other pad unit 50_2. For another example, the light-emitting unit LU includes three spare light-emitting element pad groups 52_1, 52_2 and 52_4, and the spare light-emitting element pad group 52_3 is not provided, so that only three pad units 50 are constituted in the light-emitting unit LU.

As shown in FIG. 1, in the light-emitting apparatus LD, the plurality of light-emitting elements 200 are installed on the light-emitting substrate 100. Each of the plurality of light-emitting elements 200 is coupled to a main light-emitting element pad group 51 or a spare light-emitting element pad group 52 on the light-emitting substrate 100. In some embodiments, an anode of a (e.g., each) light-emitting element 200 is coupled to an anode pad P1 of a main light-emitting element pad group 51, and a cathode of the light-emitting element 200 is coupled to a cathode pad N1 of the main light-emitting element pad group 51, so that the light-emitting element 200 is coupled to the main light-emitting element pad group 51. In some other embodiments, an anode of a (e.g., each) light-emitting element 200 is coupled to an anode pad P2 of a spare light-emitting element pad group 52, and a cathode of the light-emitting element 200 is coupled to a cathode pad N2 of the spare light-emitting element pad group 52, so that the light-emitting element 200 is coupled to the spare light-emitting element pad group 52.

In some possible implementations, in the light-emitting apparatus LD, the four main light-emitting element pad groups 51_1 to 51_4 in the light-emitting unit LU are coupled to the four light-emitting elements 200_1 to 200_4 in one-to-one correspondence. Based on this, at least one additional light-emitting element 200 may be provided for the light-emitting unit LU, and each additional light-emitting element 200 is coupled to a spare light-emitting element pad group 52 in the light-emitting unit LU.

In some other possible implementations, in the light-emitting apparatus LD, the four pad units 50_1 to 50_4 in the light-emitting unit LU are coupled to the four light-emitting elements 200_1 to 200_4 in one-to-one correspondence, in which the three light-emitting elements 200_1, 200_2 and 200_3 may be coupled to the main light-emitting element pad groups 51_1, 51_2 and 51_3 in the three pad units, and the remaining light-emitting element 200_4 is coupled to the spare light-emitting element pad group 52_4.

It can be seen from the above that, in the light-emitting substrate 100 in the embodiments of the present disclosure, a (e.g., each) light-emitting unit LU includes main light-emitting element pad groups 51 connected in series and at least one spare light-emitting element pad group 52. Each spare light-emitting element pad group 52 is connected in parallel with a main light-emitting pad group 51 to constitute a pad unit 50. That is to say, each spare light-emitting element pad group 52 may replace the main light-emitting unit pad group 51 connected in parallel therewith, and form a loop with remaining main light-emitting element pad groups 51 and/or spare light-emitting element pad groups 52. In this way, in a case where a main light-emitting element pad group 51 in a pad unit 50 is damaged and cannot be repaired, a light-emitting element may be installed on the spare light-emitting element pad group 52 connected in parallel with the damaged main light-emitting element pad group 51, so that the light-emitting apparatus LD may still work normally, the repairability of the light-emitting apparatus LD may be improved, and the yield of the product may be improved. In addition, in a case where there is no abnormality of the main light-emitting element pad group 51, there is no need to install a light-emitting element on the corresponding spare light-emitting element pad group 52. In this way, before the main light-emitting element pad groups 51 and the spare light-emitting element pad group(s) 52 on the light-emitting substrate 100 are reprinted with white oil and covered by a protective adhesive, the spare light-emitting element pad group 52 on which the light-emitting element does not need to be installed is exposed. As a result, test points may be provided for a debugging process of lighting up the light-emitting elements, and it may be possible to facilitate a probe pricking test and the debugging process of lighting up the light-emitting elements.

Figure 3:
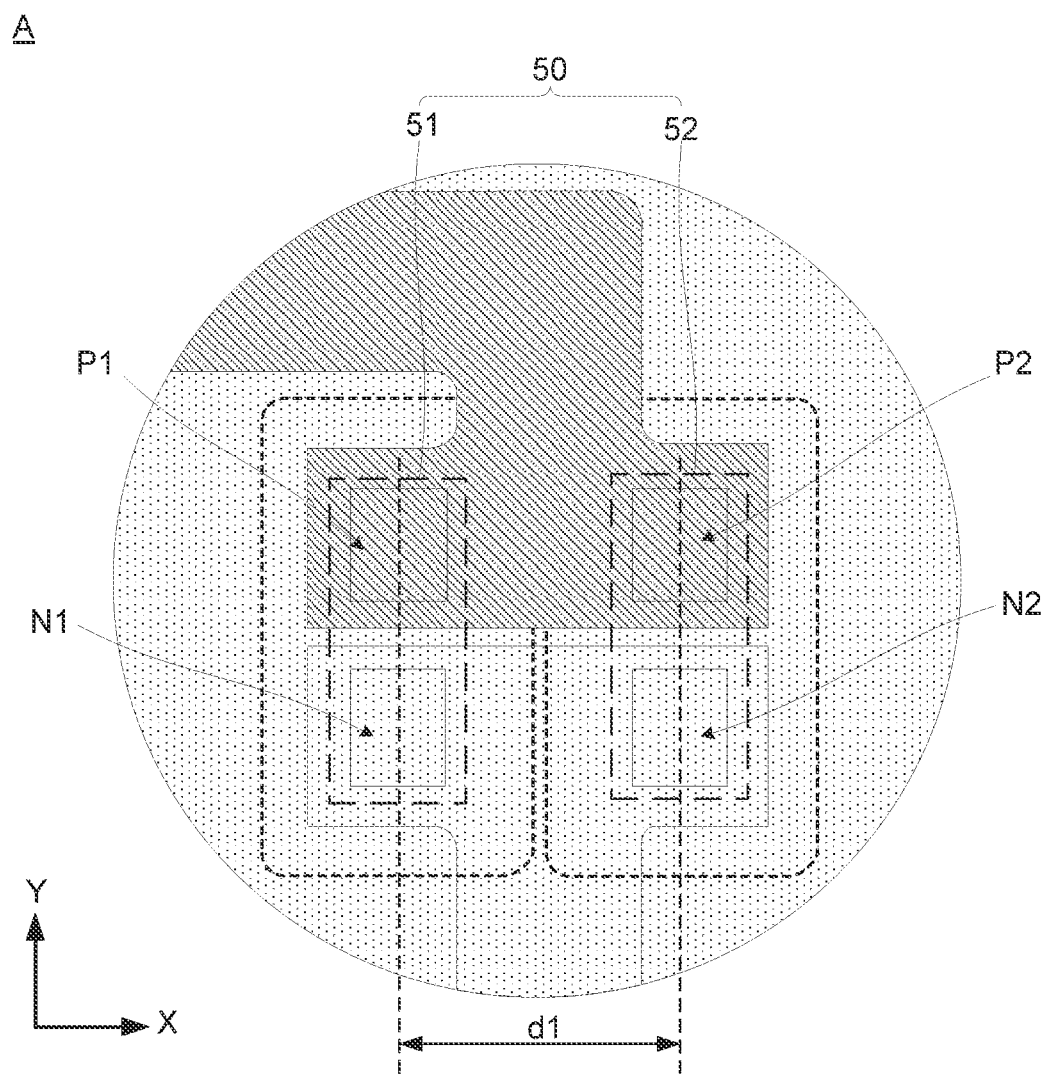
FIG. 3 is an enlarged view of the portion A in FIG. 2B, in accordance with embodiments of the present disclosure.

In some embodiments, FIG. 3 is an enlarged view of the portion A in FIG. 2B. Referring to FIG. 3, in a pad unit 50, an anode pad P1 and a cathode pad N1 in a main light-emitting element pad group 51 are arranged in a first direction, and an anode pad P2 and a cathode pad N2 in a spare light-emitting element pad group 52 are arranged in the first direction. In this way, regardless of whether a light-emitting element 200 is installed on the main light-emitting element pad group 51 or the spare light-emitting element pad group 52, light-emitting effects produced in the two cases are similar. The first direction is, for example, the Y direction.

In addition, in a case where the light-emitting apparatus serves as a backlight source to provide backlight for a display panel, for example, a display area of the display panel may be an axisymmetric pattern, and the first direction may be parallel to a symmetry axis of the display area. For example, the display area has a rectangular shape, in which case the display panel has a transverse symmetry axis and a longitudinal symmetry axis that are perpendicular to each other, and the transverse symmetry axis may be parallel to a connection line between two eyes of a viewer. For example, the first direction may be parallel to the longitudinal symmetry axis, in which case the first direction is parallel to an up-down direction (i.e., a vertical direction) of an image displayed by the display panel. In this way, the light-emitting element is longitudinally installed, and a display effect is good. Furthermore, the anode pad P1 of the main light-emitting element pad group 51 may be located on an upper side of the cathode pad N1 thereof (i.e., the Y direction in FIG. 3), and the anode pad P2 and the cathode pad N2 of the spare light-emitting element pad group 52 may similar thereto. The upper side refers to an upper side of the image displayed by the display panel in the vertical direction.

Furthermore, as shown in FIG. 3, in the pad unit 50, the anode pad P2 of the spare light-emitting element pad group 52 and the anode pad P1 of the main light-emitting element pad group 51 are arranged in a second direction (i.e., being arranged side by side), and the cathode pad N2 of the spare light-emitting element pad group 52 and the cathode pad N1 of the main light-emitting element pad group 51 are also arranged in the second direction. The second direction is, for example, the X direction. Compared with a solution in which the two anode pads P1, P2 and the two cathode pads N1, N2 are both arranged in the first direction in the pad unit 50, in the solution provided by the embodiments in the present disclosure, there is no need to bypass a cathode pad when the two anode pads P1 and P2 are connected, and there is no need to bypass an anode pad when the two cathode pads N1 and N2 are connected, which facilitates the parallel arrangement of the spare light-emitting element pad group 52 and the main light-emitting element pad group 51. In addition, the spare light-emitting element pad group 52 and the main light-emitting element pad group 51 have the same size, so that light-emitting elements of the same type may be installed thereon, which facilitates maintenance.

In some embodiments, in the pad unit 50, the main light-emitting element pad group 51 and the spare light-emitting element pad group 52 are arranged adjacent to each other. Herein, the adjacent arrangement means that a distance d1 between the main light-emitting element pad group 51 and the spare light-emitting element pad group 52 (which may be, for example, a distance between geometric centers/geometric gravity centers of the main light-emitting element pad group 51 and the spare light-emitting element pad group 52, or a distance between geometric centers/geometric gravity centers of the two anode pads, or a distance between geometric centers/geometric gravity centers of the two cathode pads) is approximately equal to a width d2 (not shown in FIG. 3) of the light-emitting element (i.e., a dimension of the light-emitting element in the second direction). For example, $(d1-d2)/d2 \leq 20\%$, and further, $(d1-d2)/d2 \leq 5\%$. For another example, $(d1-d2)/d1 \leq 20\%$, and further, $(d1-d2)/d1 \leq 5\%$. For yet another example, d1 is equal to d2 ($d1=d2$). In this case, in a case where the light-emitting elements are installed on both the main light-emitting element pad group 51 and the corresponding spare light-emitting element pad group 52, a distance between two opposite edges of the two light-emitting elements (i.e., edges that are close to each other) is less than a certain threshold. For example, the two opposite edges of the two light-emitting elements may be approximately attached to each other, so that optical influence caused by replacing the light-emitting element installed on the main light-emitting element pad group 51 with the light-emitting element installed on the spare light-emitting element pad group 52 may be small. In these embodiments, in a case where one or more main light-emitting element pad groups 51 in the light-emitting unit are damaged and cannot be repaired, light-emitting element(s) on the damaged main light-emitting element pad group(s) 51 may be transferred onto corresponding spare light-emitting element pad group(s) 52.

In some embodiments, the plurality of pad units 50 in the light-emitting unit LU are arranged in an array, for example, the plurality of pad units 50 are arranged in Z1 rows and Z2 columns, Z1 and Z2 are both integers, and a product of Z1 and Z2 (i.e., Z1 by Z2) is greater than or equal to 2. The row direction may be the X direction, and the column direction may be the Y direction. For example, as shown in FIGS. 2A and 2B, the light-emitting unit LU includes four pad units 50 arranged in two rows and two columns.

In addition, a light-emitting region of the light-emitting unit LU (i.e., a region where the light-emitting unit LU is located) is a region that may be illuminated by the light-emitting unit LU after light-emitting elements and a driver chip are installed on the light-emitting unit LU. In a case where the plurality of pad units 50 in the light-emitting unit LU are arranged in an array, the light-emitting region of the light-emitting unit LU may have an approximately rectangular shape. In some embodiments, the light-emitting apparatus may serve as the backlight source of the display panel, and the display area of the display panel may also have an approximately rectangular shape. In this case, the light-emitting region of each light-emitting unit LU is a sub-region of the backlight source, since the light-emitting region of each light-emitting unit LU may have an approximately rectangular shape, the plurality of light-emitting units LU arranged in an array may opposite to an entire display area of the display panel to achieve illumination of the entire display area. Moreover, brightness of backlight emitted by each sub-region of the backlight source is adjustable, for example, adjusted according to brightness of an image to be presented, so that a good contrast may be achieved.

The embodiments in the present disclosure, the term "having an approximately rectangular shape" means that the shape of each of the display area of the display panel and the light-emitting region of the light-emitting unit LU is a rectangular shape as a whole, but is not limited to a standard rectangular shape. For example, a contour of the display area of the display panel and a boundary of the light-emitting region of the light-emitting unit LU are allowed to be non-linear (e.g., arc-shaped).

In some embodiments, the light-emitting unit LU includes a plurality of pad units 50. According to a connection sequence of the plurality of pad units 50 in the light-emitting unit LU, in two adjacent pad units 50 (" "e.g., two pad units 50 arranged in the X direction or in the Y direction), a distance between two main light-emitting element pad groups 51 is approximately equal to a distance between two spare light-emitting element pad groups 52. For example, as shown in FIGS. 2A and 2B, in the light-emitting unit LU, the four main light-emitting element pad groups 51_1 to 51_4 and the four spare light-emitting element pad groups 52_1 to 52_4 are connected in parallel in one-to-one correspondence to constitute four pad units 50_1 to 50_4. The pad units 50_1 to 50_4 are sequentially connected in series, that is, cathode pads N1 and N2 of the pad unit 50_1 are coupled to anode pads P1 and P2 of the pad unit 50_2, and so on, until cathode pads N1 and N2 of the pad unit 50_3 are coupled to anode pads P1 and P2 of the pad unit 50_4).

Figure 4:
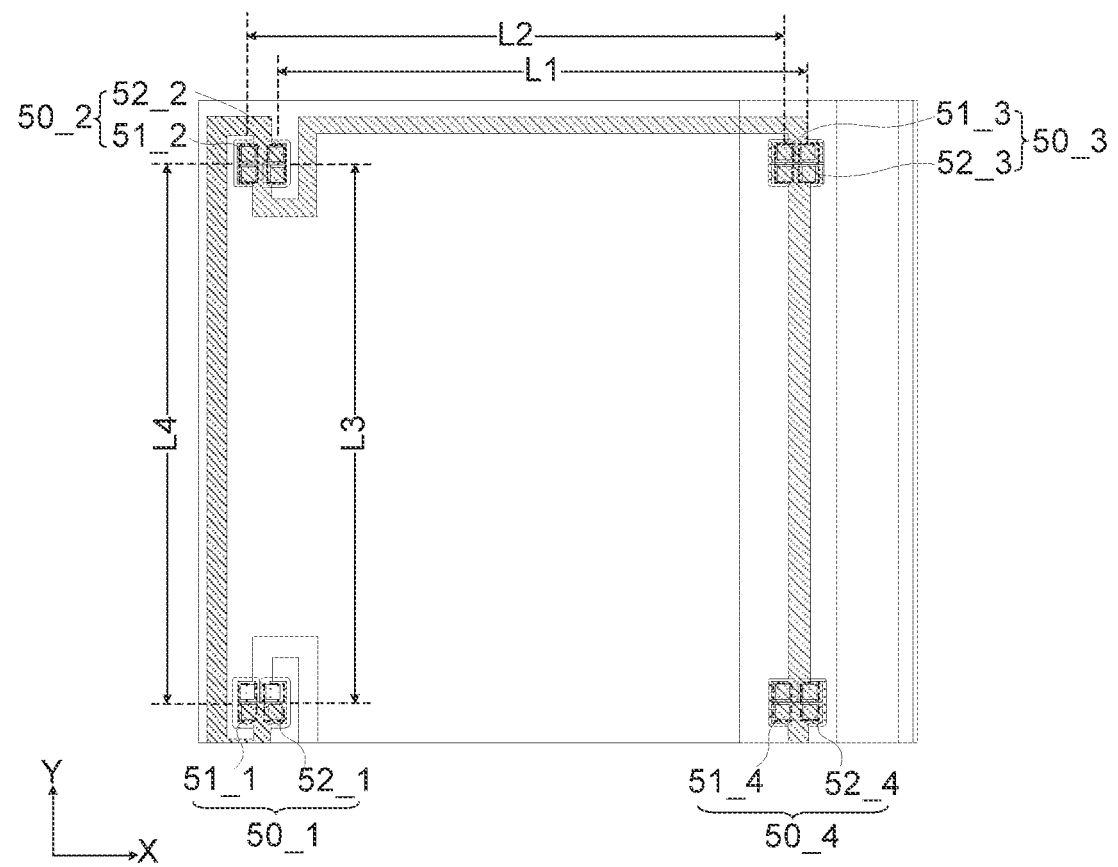
FIG. 4 is a local view of FIG. 2B, in accordance with embodiments of the present disclosure.

For example, FIG. 4 is a partial view of FIG. 26. As shown in FIG. 4, in the two adjacent pad units 50_1 and 50_2, a distance between the main light-emitting unit pad groups 51_1 and 51_2 is denoted as L4, a distance between the spare light-emitting unit pad groups 52_1 and 52_2 is denoted as L3, and L3 is approximately equal to L4. As an example, $(L3-L4)/L4 \leq 5\%$. For example, L3 may be equal to L4 ($L3=L4$). For another example, as shown in FIG. 4, in the two adjacent pad units 50_2 and 50_3, a distance between the main light-emitting unit pad groups 51_2 and 51_3 is denoted as L2, a distance between the spare light-emitting unit pad groups 52_2 and 52_3 is denoted as L1, and L2 is approximately equal to L1. As an example, $(L2-L1)/L1 \leq 5\%$. For example, L2 may be equal to L1 ($L2=L1$). In this way, in two adjacent pad units in the light-emitting unit LU, regardless of whether light-emitting elements are installed on two spare light-emitting element pad groups or two main light-emitting element pad groups, optical effects produced in the two cases are similar. As a result, in a case where the two cases are replaced with each other, fluctuation of the optical effect corresponding to the light-emitting unit LU is small.

Herein, a distance between two adjacent main light-emitting unit pad groups or two adjacent spare light-emitting unit pad groups may be a distance between geometric centers (or geometric gravity centers) thereof.

As an example, the plurality of pad units 50 in the light-emitting unit LU may be arranged in an array in the X direction and the Y direction. Based on this, in the X direction, a distance between two adjacent spare light-emitting element pad groups 52 (e.g., L1) is approximately equal to a distance between two adjacent main light-emitting element pad groups 51 (e.g., L2). In addition, in the Y direction, a distance between two adjacent spare light-emitting element pad groups 52 (e.g., L3) is approximately equal to a distance between two adjacent main light-emitting element pad groups 51 (e.g., L4). L4 may be greater than L2, and L3 may be greater than L1. For example, L4 may range from a difference of 8658 μm and 100 μm to a sum of 8658 μm and 100 μm (i.e., 8558 μm to 8758 μm), or may range from a difference of 8658 μm and 50 μm to a sum of 8658 μm and 50 μm, such as 8658 μm. L2 may range from a difference of 8612 μm and 100 μm to a sum of 8612 μm and 100 μm, or may range from a difference of 8612 μm and 50 μm to a sum of 8612 μm and 50 μm, such as 8612 μm. For another example, L3 may range from a difference of 8658 μm and 100 μm to a sum of 8658 μm and 100 μm, or may range from a difference of 8658 μm and 50 μm to a sum of 8658 μm and 50 μm, such as 8658 μm. L1 may range from a difference of 8612 μm and 100 μm to a sum of 8612 μm and 100 μm, or may range from a difference of 8612 μm and 50 μm to a sum of 8612 μm and 50 μm, such as 8612 μm.

Further, in some embodiments, the light-emitting unit LU further includes a plurality of first lines, which are disposed between the driving voltage terminal Vled and the main driver chip pad group 53, and the plurality of main light-emitting element pad groups 51 are sequentially connected (i.e., connected in series). An anode pad P1 of a main light-emitting element pad group 51 and an anode pad P2 of a corresponding spare light-emitting element pad group 52 may be connected to a first line, and cathode pads N1 and N2 thereof may be connected to another first line. The two first lines connect the main light-emitting element pad group 51 and the spare light-emitting element pad group 52 in parallel to constitute a pad unit 50. For example, as shown in FIGS. 2A and 2B, the light-emitting unit LU further includes first lines 55_1 to 55_5, which are disposed between the driving voltage terminal Vled and the main driver chip pad group 53. The first lines 55_1 to 55_5 are configured to sequentially connect the main light-emitting element pad groups 51_1 to 51_4 in series, and sequentially connect the spare light-emitting element pad groups 52_1 to 52_4 in series as well, so that a pad unit 50 may be constituted between any two adjacent first lines, that is, the plurality of pad units 50_1 to 50_4 may be constituted. In this case, when the main light-emitting element pad group 51 and/or the spare light-emitting element pad group 52 in each pad unit 50 are turned on, the driving voltage terminal Vled is electrically connected to the main driver chip pad group 53.

As shown in FIGS. 2A and 26, considering the pad unit 50_2 as an example, a connection structure of the pad unit 50_2 and two first lines corresponding thereto will be described in detail. The two first lines 55_2 and 55_3 connected to the main light-emitting element pad group 51_2 in the pad unit 50_2 are referred to as a first connection line 55_2 and a second connection line 55_3. In the pad unit 50_2, an anode pad P2 of the spare light-emitting element pad group 52_2 and an anode pad P1 of the main light-emitting element pad group 51_2 are both connected to the first connection line 55_2; a cathode pad N2 of the spare light-emitting element pad group 52_2 and a cathode pad N1 of the main light-emitting element pad group 51_2 are both connected to the second connection line 55_3. In this way, the anode pad P1 (or the cathode pads N) of the main light-emitting element pad group 51_2 and the anode pad P2 of the spare light-emitting element pad group 52_2 may be connected through one first line instead of two first lines. In a case where areas occupied by the first lines are the same, a width of the first line in these embodiments may be set large, that is, a cross-sectional area of the first line may be designed to be large. As can be seen from the law of resistance, i.e., $R=\rho L/S$, the larger the cross-sectional area of the first line is, the smaller a resistance thereof is. Therefore, in these embodiments, the resistance of the first line is small, the electrical performance thereof is high, and a design thereof is simple, which facilitates production.

Figure 5:
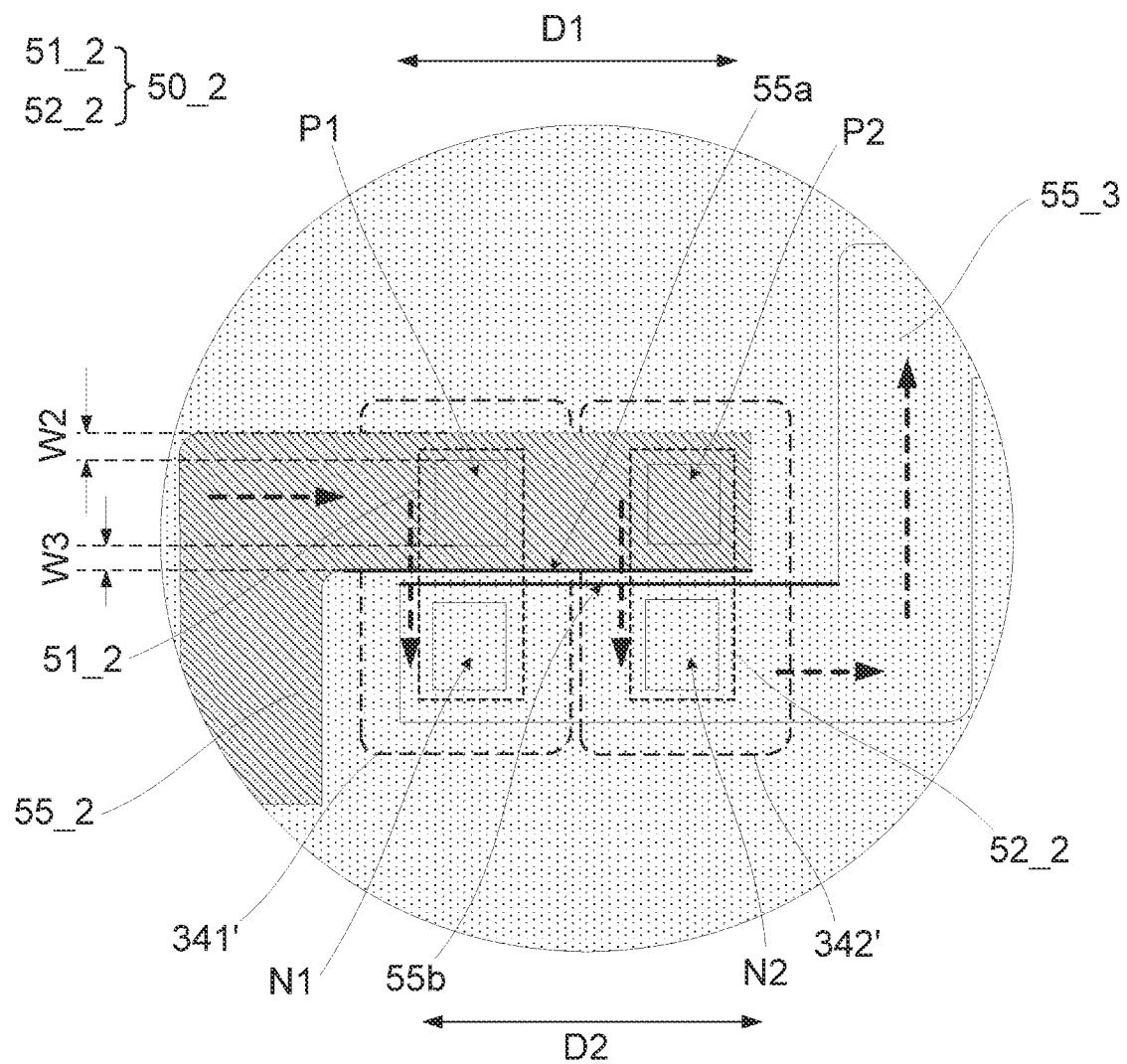
FIG. 5 is an enlarged view of an alternative portion A in FIG. 2B, in accordance with embodiments of the present disclosure.
Figure 6:
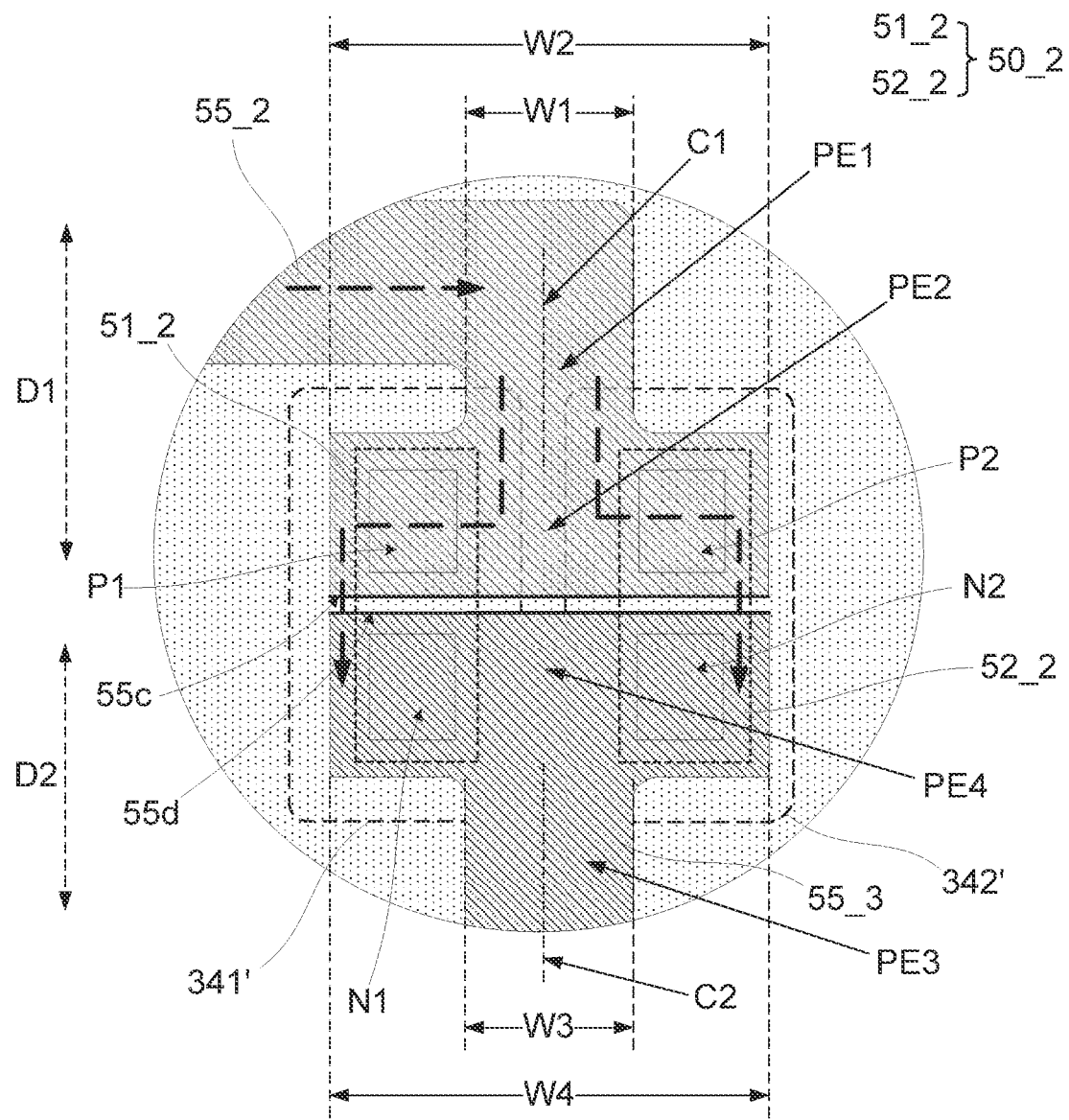
FIG. 6 is an enlarged view of the portion A in FIG. 2B, in accordance with embodiments of the present disclosure.

It can be understood that, a wiring design of the first connection line 55_2 and the second connection line 55_3 (two first lines) is not unique. FIGS. 5 and 6 show different shapes of two first lines. Referring to FIGS. 26, 5 and 6, in the pad unit 50_2, the anode pad P1 of the spare light-emitting element pad group 52_2 and the anode pad P2 of the main light-emitting element pad group 51_2 are disposed at an end of the first connection line 55_2 and connected thereto, and the cathode pads N1 and N2 thereof are disposed at an end of the second connecting line 55_3 and connected to the end of the second connecting line 55_3. For example, the anode pads P1 and P2 are a part of the end of the first connection line, and the cathode pads N1 and N2 are a part of the end of the second connection line.

In some embodiments, referring to FIG. 5, the end of the first connection line 55_2 extends from an anode pad to the other anode pad in the pad unit 50_2, for example, the end of the first connection line 55_2 extends from the anode pad P1 of the main light-emitting element pad group 51_2 to the anode pad P2 of the spare light-emitting element pad group 52_2 in the pad unit 50_2. In this case, the two anode pads P1 and P2 in the pad unit 50_2 are arranged side by side in an extension direction D1 of the end of the first connection line 55_2.

Referring to FIG. 5, the end of the second connection line 55_3 extends from a cathode pad to the other cathode pad in the pad unit 50_2, for example, the end of the second connection line 55_3 extends from the cathode pad N1 of the spare light-emitting element pad group 52_2 to the cathode pad N2 of the main light-emitting element pad group 51_2 in the pad unit 50_2. In this case, the two cathode pads N1 and N2 in the pad unit 50_2 are arranged side by side in an extension direction D2 of the end of the second connection line 55_3. The extension direction D2 of the end of the second connection line 55_3 may be the same as the extension direction D1 of the first connection line 55_2. For example, a side surface 55a of the end of the first connection line 55_2 and a side surface 55b of the end of the second connection line 55_3 are arranged parallel to and opposite to each other.

In these embodiments, two anode pads P1 and P2 (or two cathode pads N1 and N2) in a same pad unit are both arranged in an extension direction of an end of a first line. In this case, widths of the first line at various positions may be equal, and such a first line has a simple structure and is easy to design and manufacture.

In some other embodiments, the first connection line 55_2 and/or the second connection line 55_3 are widened. In some examples, as shown in FIG. 6, the end of the first connection line 55_2 is divided into a first pattern PE1 and a second pattern PE2 that are sequentially arranged in the extension direction D1 of the end of the first connection line 55_2. The second pattern PE2 is enclosed by extending and converging two side surfaces of the first pattern PE1. For example, the first pattern PE1 and the second pattern PE2 are of an integral structure. In this case, a width W2 of the second pattern PE2 is greater than a width W1 of the first pattern PE1. Herein, each of the widths of second pattern PE2 and the first pattern PE1 is a dimension of the second pattern PE2 and the first pattern PE1 in a direction perpendicular to the extension direction D1. The second pattern PE2 may also be referred to as a pad position. The anode pad P2 of the spare light-emitting element pad group 52_2 and the anode pad P1 of the main light-emitting element pad group 51_2 in the pad unit 50_2 are both arranged on the second pattern PE2 and connected to the second pattern PE2. For example, they may be surrounded by the second pattern PE2 and form an integral pattern with the second pattern PE2. In addition, an arrangement direction of them is substantially perpendicular to the extension direction D1 of the end of the first connection line 55_2, and they are located at both sides of a center line C1 of the first pattern PE1. The center line C1 of the first pattern PE1 is parallel to the extension direction D1 of the end of the first connection line 55_2, and is at a same distance from the two side surfaces, parallel to the extension direction D1, of the first pattern PE1.

In this way, in a case where the main light-emitting element pad group 51_2 is damaged, a width of a current effective channel of the spare light-emitting element pad group 52_2 is shown as W1 in FIG. 6, which is unchanged, and electrical performance is good. Correspondingly, referring to FIG. 5, in a case where the main light-emitting element pad group 51_2 is damaged, a width of a current effective channel of the spare light-emitting element pad group 52_2 is a sum of W2 and W3, which may also allow current to pass. The dashed arrows in FIGS. 5 and 6 indicate the direction of current flow.

For example, As shown in FIG. 6, the anode pad P2 of the spare light-emitting element pad group 52_2 and the anode pad P1 of the main light-emitting element pad group 51_2 in the pad unit 50_2 are symmetrically arranged with respect to the center line C1 of the first pattern PE1. In this way, it may be possible to ensure that in a case where the spare light-emitting element pad group 52_2 is used to replace the main light-emitting element pad group 51_2 to be coupled to the light-emitting element, a difference between currents flowing through the light-emitting element is small, and the fluctuation of the light-emitting effect of the light-emitting element is small.

In some examples, as shown in FIG. 6, the end of the second connection line 55_3 is divided into a third pattern PE3 and a fourth pattern PE4 that are sequentially arranged in the extension direction D2 of the end of the second connection line 55_3. Similar to the structures of the first and second patterns PE1 and PE2, the fourth pattern PE4 is enclosed by extending and converging two side surfaces of the third pattern PE3. For example, the third pattern PE3 and the fourth pattern PE4 are of an integral structure. In this case, a width W4 of the fourth pattern PE4 is greater than a width W3 of the third pattern PE3. Herein, the widths of the fourth pattern PE4 and the third pattern PE3 are a dimension of the fourth pattern PE4 and the third pattern PE3 in a direction perpendicular to the extending direction D2. The fourth pattern PE4 may be referred to as a pad position. The cathode pad N2 of the spare light-emitting element pad group 52_2 and the cathode pad N1 of the main light-emitting element pad group 51_2 in the pad unit 50_2 are both arranged on the fourth pattern PE4 and connected to the fourth pattern PE4. For example, they may be surrounded by the fourth pattern PE4 and form an integral pattern with the fourth pattern PE4. In addition, an arrangement direction of them is substantially perpendicular to the extension direction D2 of the end of the second connection line 55_3, and they are located at both sides of a center line C2 of the third pattern PE3. The center line C2 of the third pattern PE3 is parallel to the extension direction D2 of the end of the second connection line 55_3, and is at a same distance from the two side surfaces, parallel to the extension direction D2, of the third pattern PE3. Similar to the first connection line 55_2, it may also be possible to ensure that the width of the current effective channel of the spare light-emitting element pad group 52_2 is unchanged, and the electrical performance is good.

For example, as shown in FIG. 6, the cathode pad N2 of the spare light-emitting element pad group 52_2 and the cathode pad N1 of the main light-emitting element pad group 51_2 in the pad unit 50_2 are symmetrically arranged with respect to the center line C2 of the third pattern PE3. Similarly, in this way, it may be possible to ensure that in the case where the spare light-emitting element pad group 52_2 is used to replace the main light-emitting element pad group 51_2 to be coupled to the light-emitting element, the fluctuation of the light-emitting effect of the light-emitting element is small.

In a possible implementation, structures of the first connection line 55_2 and the second connection line 55_3 are both as shown in FIG. 6, and the extension direction D2 of the end of the second connection line 55_3 may be the same as the extension direction D1 of the end of the first connection line 55_2. In addition, end surfaces 55c and 55d of the end of the first connection line 55_2 and the end of the second connection line 55_3 are arranged opposite to and parallel to each other.

In another feasible implementation, the structures of the first connection line 55_2 and the second connection line 55_3 may be different. For example, the structure of the first connection line 55_2 may be as shown in FIG. 5, and the structure of the second connection line 55_3 is as shown in FIG. 6. For another example, the structure of the first connection line 55_2 may be as shown in FIG. 6, and the structure of the second connection line 55_3 is as shown in FIG. 5.

For connection structures of the remaining pad units 50_1, 50_3 and 50_4 and corresponding first connection lines and second connection lines, reference may be made to FIGS. 5 and 6, and details will not be repeated herein.

Figure 7A:
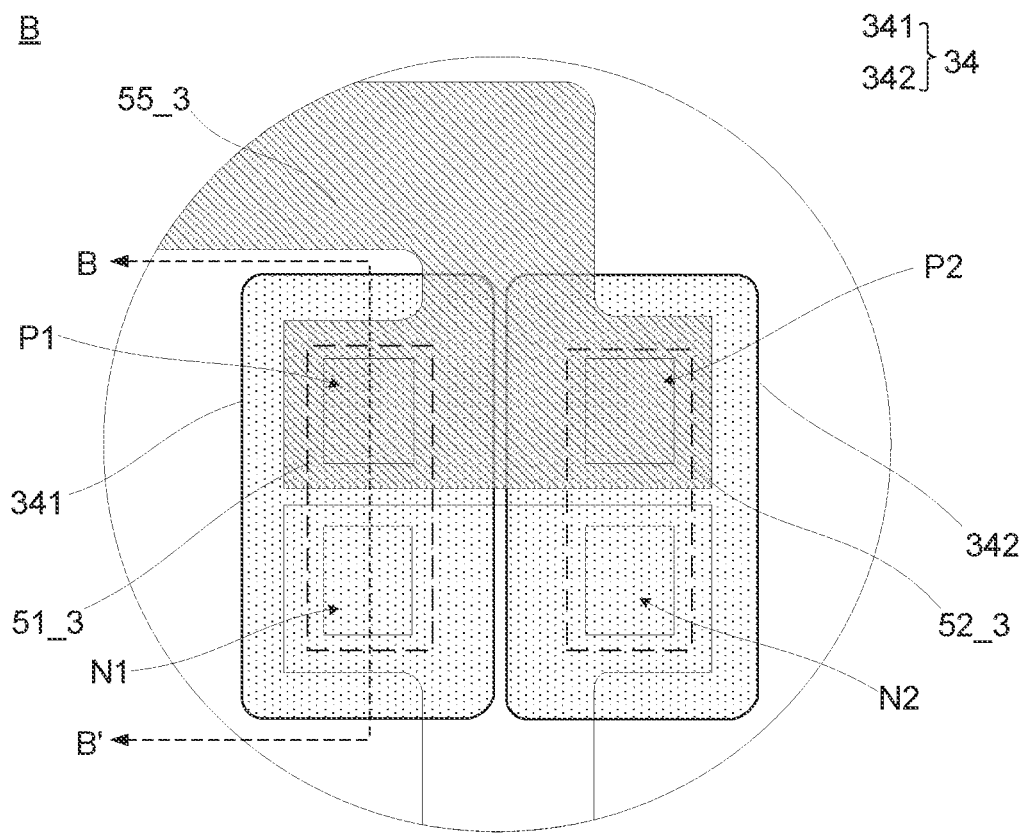
FIG. 7A is an enlarged view of the portion B in FIG. 2B, in accordance with embodiments of the present disclosure.
Figure 7B:
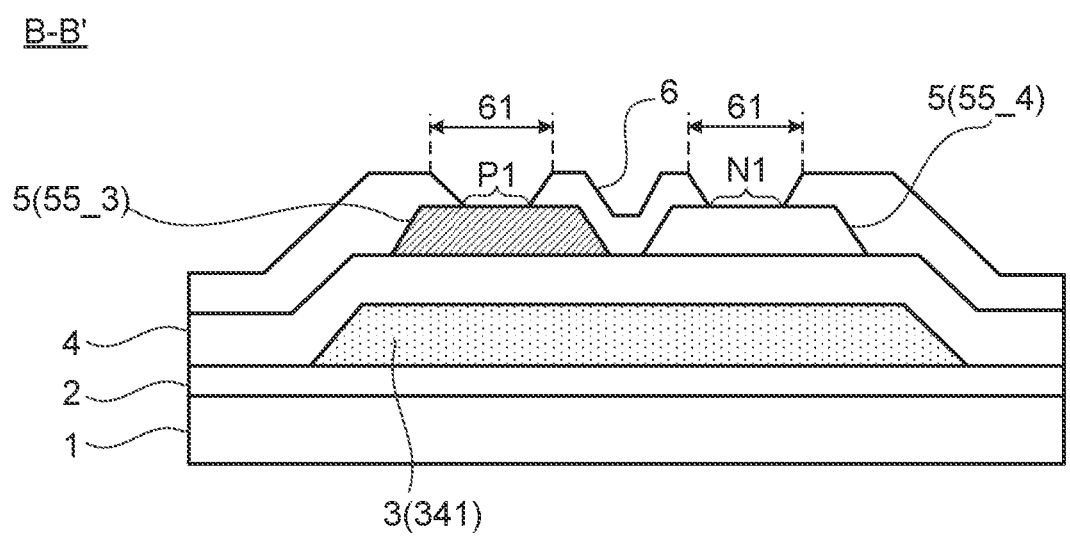
FIG. 7B is a sectional view of the light-emitting substrate taken along the line B-B' in FIG. 7A, in accordance with embodiments of the present disclosure.

In some embodiments, FIG. 7A is an enlarged view of the portion B in the light-emitting substrate shown in FIG. 2B. FIG. 7B is a sectional view of the light-emitting substrate taken along the line B-B' shown in FIG. 7A. Referring to FIGS. 7A and 7B, the light-emitting substrate 100 further includes at least one first support pad (which may also be referred to as a first support pattern) 34. A first support pad 34 corresponds to a pad unit 50, is located on a side of the pad unit 50 close to the base 1, and includes two first sub-patterns 341 and 342 separated from each other. Herein, being separated from each other may mean that there is no connection between each other, or there is no contact between each other. Considering the pad unit 50_3 as an example, as shown in FIGS. 7A and 76, in the pad unit 503, the first sub-pattern 341 is located right under the main light-emitting element pad group 51_3, and the first sub-pattern 342 is located right under the spare light-emitting element pad group 52_3. For example, an orthogonal projection of the main light-emitting element pad group 51_3 on the base 1 is within an orthogonal projection of a first sub-pattern 341 in a first pad liner on the base 1, and an orthogonal projection of the spare light-emitting element pad group 52_3 on the base 1 is within an orthogonal projection of the other first sub-pattern 342 in the first pad liner on the base. In this way, in a case where light-emitting element(s) installed on the pad unit 50_3 are damaged and cannot be repaired, the two pads P1 and N1 of the main light-emitting element pad group 51_3 may be connected to the first sub-pattern 341 (e.g., they are connected through a laser welding process), and/or the two pads P2 and N2 of the spare light-emitting element pad group 52_3 may be connected to the first sub-pattern 342, so that light-emitting elements installed on the remaining pad units 50_1, 50_2 and 50_4 are still capable of emitting light in paths connected in series, and the damaged products may be repaired to a certain extent.

For example, the light-emitting substrate 100 includes a plurality of (e.g., two) first support pads 34, which correspond to some pad units (e.g., the pad units 50_3 and 50_4) in the light-emitting unit LU in one-to-one correspondence. Other support pads may be disposed under the pad units 50_1 and 50_2 (i.e., on a side close to the base 1), and these support pads form an integral pattern with another pattern in the light-emitting substrate 100, such as a common voltage line 33 hereinafter. In this case, parts of the common voltage line 33 (e.g., portions shown by the dashed boxes 341' and 342' in FIGS. 5 and 6) may be considered as support pads of the pad units 50_1 and 50_2.

In some embodiments, referring to FIG. 7B, according to arrangement of layers included in the light-emitting substrate 100, the light-emitting substrate 100 may include a first conductive layer 3, a first insulating layer 4, a second conductive layer 5 and a second insulating layer 6 that are sequentially stacked on the base 1. The first conductive layer 3 is closer to the base 1 than the second conductive layer 5.

The first support pads 34 may be located in the first conductive layer 3, and the main light-emitting element pad groups 51 and the spare light-emitting element pad groups 52 in the light-emitting units LU may be located in the second conductive layer 5. The second insulating layer 6 is provided with a plurality of first via holes 61, and a portion of the second conductive layer 5 exposed by a first via hole 61 serve as an anode pad P (e.g.,) or a cathode pad.

In addition, as shown in FIG. 76, the light-emitting substrate 100 may further include a buffer layer 2 disposed between the base 1 and the first conductive layer 3. For example, the buffer layer 2 may increase adhesion between the first conductive layer 3 and the base 1. FIG. 7B illustrates an example in which a portion of the second conductive layer 5 exposed by a first via 61 serves as an anode pad P1 of the main light-emitting element pad group 51, and a portion of another first via 61 exposed serves as a cathode pad N1 of the main light-emitting element pad group 51.

Materials of the buffer layer 2, the first insulating layer 4 and the second insulating layer 6 may each include at least one of silicon nitride, silicon oxide or the like, and they may each have a single-layer structure or a multi-layer structure. For example, the multi-layer structure may include a double-layer structure formed by stacking a silicon oxide layer and a silicon nitride layer. Materials of the first conductive layer 3 and the second conductive layer 5 may be selected from elemental metals such as copper (Cu), aluminum (Al), molybdenum (Mo), titanium (Ti), chromium (Cr) and tungsten (W), or alloys composed of at least two of the above elemental metals, which is not limited herein.

Figure 8A:
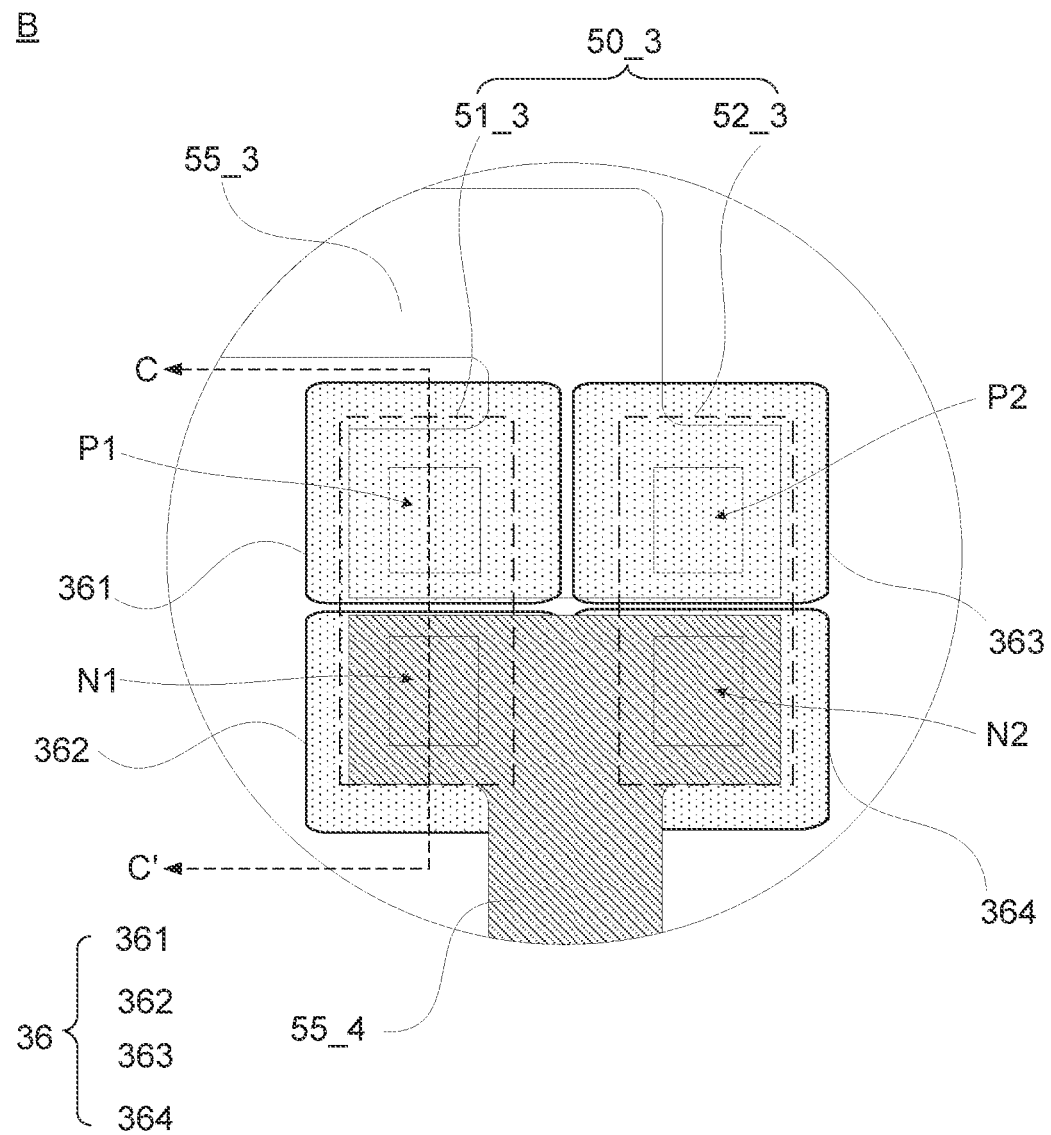
FIG. 8A is another enlarged view of the portion B in the light-emitting substrate shown in FIG. 2B, in accordance with embodiments of the present disclosure.
Figure 8B:
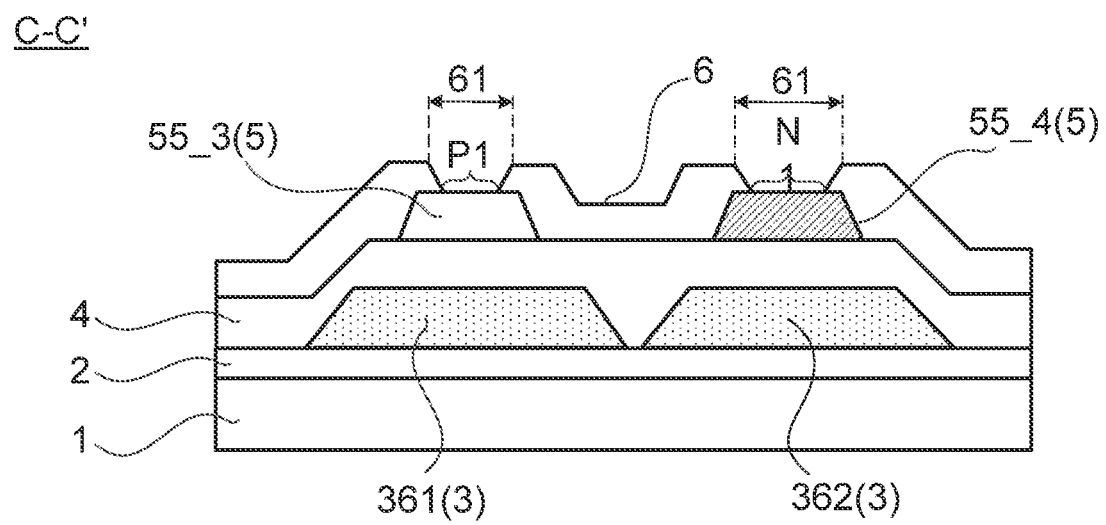
FIG. 8B is a sectional view of the light-emitting substrate taken along the line C-C' in FIG. 8A, in accordance with embodiments of the present disclosure.

In some other embodiments, FIG. 8A is another enlarged view of the portion B in the light-emitting substrate 100 shown in FIG. 2B. FIG. 8B is a sectional view of the light-emitting substrate 100 taken along the line C-C' shown in FIG. 8A. For description of the layers in the light-emitting substrate shown in FIG. 86, reference may be made to the description in the embodiments corresponding to FIG. 7B. Referring to FIGS. 8A and 8B, the light-emitting substrate 100 further includes at least one (i.e., one or a plurality of) second support pads (which may also be referred to as a second support pattern) 36. A second support pad 36 corresponds to a pad unit 50, is located on a side of the pad unit 50 close to the base 1, and includes a plurality of second sub-patterns separated from each other, such as four second sub-patterns 361, 362, 363 and 364. Considering the pad unit 50_3 as the example, a second sub-pattern is disposed right under each pad in the pad unit 50_3. For example, orthogonal projections of the pads (i.e., the two anode pads P1 and P2 and the two cathode pads N1 and N2) included in the main light-emitting element pad group 51_3 and the spare light-emitting element pad group 52_3 on the base 1 are within orthogonal projections of the plurality of second sub-patterns 361 to 364 on the base 1 in one-to-one correspondence. In this way, in a case where the pads P2 and N2 of the spare light-emitting element pad group 52_3 are used as test points, for example, even if the anode pad P2 is pricked to be coupled to a second sub-pattern under the anode pad P2, a short circuit does not occur between the anode pad P2 and another pad such as the cathode pad N2, so that reliability of the product may be improved.

For example, the light-emitting substrate includes a plurality of (e.g., two) second support pads 36, and these second support pads 36 are in one-to-one correspondence with some pad units (e.g., the pad units 50_3 and 50_4) in the light-emitting unit LU. Parts of the common voltage line 33 right under the pad units 50_1 and 50_2 may be used as the support pads of the pad units 50_1 and 50_2.

In some embodiments, referring to FIGS. 2A and 2B, the light-emitting unit LU further includes a spare driver chip pad group 54, and the main driver chip pad group 53 and the spare driver chip pad group 54 are connected in parallel. In this case, in the light-emitting substrate provided in the embodiments of the present disclosure, each light-emitting unit LU is provided with a main driver chip pad group 53 and a spare driver chip pad group 54. In this way, in a case where the main driver chip pad group in the light-emitting unit LU is damaged and cannot be repaired, a driver chip 300 may be installed on the spare driver chip pad group 54, so that repairability of the light-emitting substrate may be improved, and a yield of the product may be improved. In addition, in a case where there is no abnormality of the main driver chip pad group 53, before the main driver chip pad group 53 and the spare driver chip pad group 54 is reprinted with white oil and covered by a protective adhesive, exposed pads on the spare driver chip pad group 54 may also provide test points for a debugging process of lighting up the light-emitting elements. That is, the exposed pads on the spare driver chip pad group 54 may be used for the probe pricking test, which facilitates the debugging process of lighting up the light-emitting elements.

Referring to FIG. 2A, in the light-emitting unit LU, the main driver chip pad group 53 and the spare driver chip pad group 54 each include a first input pad Di, a second input pad Pwr, an output pad Out, and a common voltage pad Gnd. In this case, the parallel arrangement of the main driver chip pad group 53 and the spare driver chip pad group 54 means that: the first input pad Di of the main driver chip pad group 53 is coupled to the first input pad Di of the spare driver chip pad group 54; the second input pad Pwr of the main driver chip pad group 53 is coupled to the second input pad Pwr of the spare driver chip pad group 54; the output pad Out of the main driver chip pad group 53 is coupled to the output pad Out of the spare driver chip pad group 54; the common voltage pad Gnd of the main driver chip pad group 53 is coupled to the common voltage pad Gnd of the spare driver chip pad group 54.

The spare driver chip pad group 54 and the main driver chip pad group 53 have same functions. For convenience of description, the functions of the pads of the main driver chip pad group 53 will be described below by taking the main driver chip pad group 53 as an example.

The first input pad Di is configured to receive a first input signal. The first input signal is, for example, an address signal for gating a driver chip 300 at a corresponding address, and the driver chip 300 is installed on the main driver chip pad group 53. For example, addresses of driver chips 300 installed on different light-emitting units LU may be the same or different. The first input signal may be an 8-bit address signal, and the driver chip installed on the main driver chip pad group 53 may resolve the address signal to obtain an address to be transmitted.

The second input pad Pwr is configured to receive a second input signal, which is, for example, a power line carrier communication signal. For example, the second input signal not only provides power to the driver chip 300 installed on the main driver chip pad group 53, but also transmits communication data to the driver chip 300. The communication data may be used to control a light-emitting duration of a corresponding light-emitting unit LU, thereby controlling a visual brightness thereof.

The output pad Out is configured to output a driving signal and a relay signal. For example, the relay signal is an address signal provided to driver chip 300 installed on another light-emitting units LU. That is, a first input pad Di of the driver chip 300 installed on another light-emitting units LU receives the relay signal as a first input signal, thereby obtaining an address signal. For example, the driving signal may be a driving current for driving the light-emitting elements installed on the light-emitting unit LU to emit light.

The common voltage pad Gnd is configured to receive a common voltage signal, such as a ground signal.

In this case, the driver chip 300 installed on the main driver chip pad group 53 is configured to output a relay signal through the output pad Out according to the first input signal received by the first input pad Di and the second input signal received by the second input pad Pwr in a first period, and to provide a driving signal through the output pad Out to the plurality of light-emitting elements sequentially connected in series in a second period. For example, in the first period, the output pad Out outputs a relay signal, and the relay signal is provided to driver chip 300 installed on another light-emitting units LU, so that the driving chip 300 installed on another light-emitting units LU obtains an address signal. In the second period, the output pad Out outputs a driving signal, and the driving signal is provided to the plurality of light-emitting elements sequentially connected in series, so that the light-emitting elements may emit light in the second period. It will be understood that, the first period and the second period are different periods, and the first period may be, for example, earlier than the second period. The first period may be consecutive to the second period, and an end time of the first period is a start time of the second period. Or, there may be other period(s) between the first period and the second period, which may be used to achieve other required function(s). Or, the other period(s) may be used only to separate the first period and the second period, so as to prevent the signals output through the output pad Out in the first period and the second period from interfering with each other.

Figure 9:
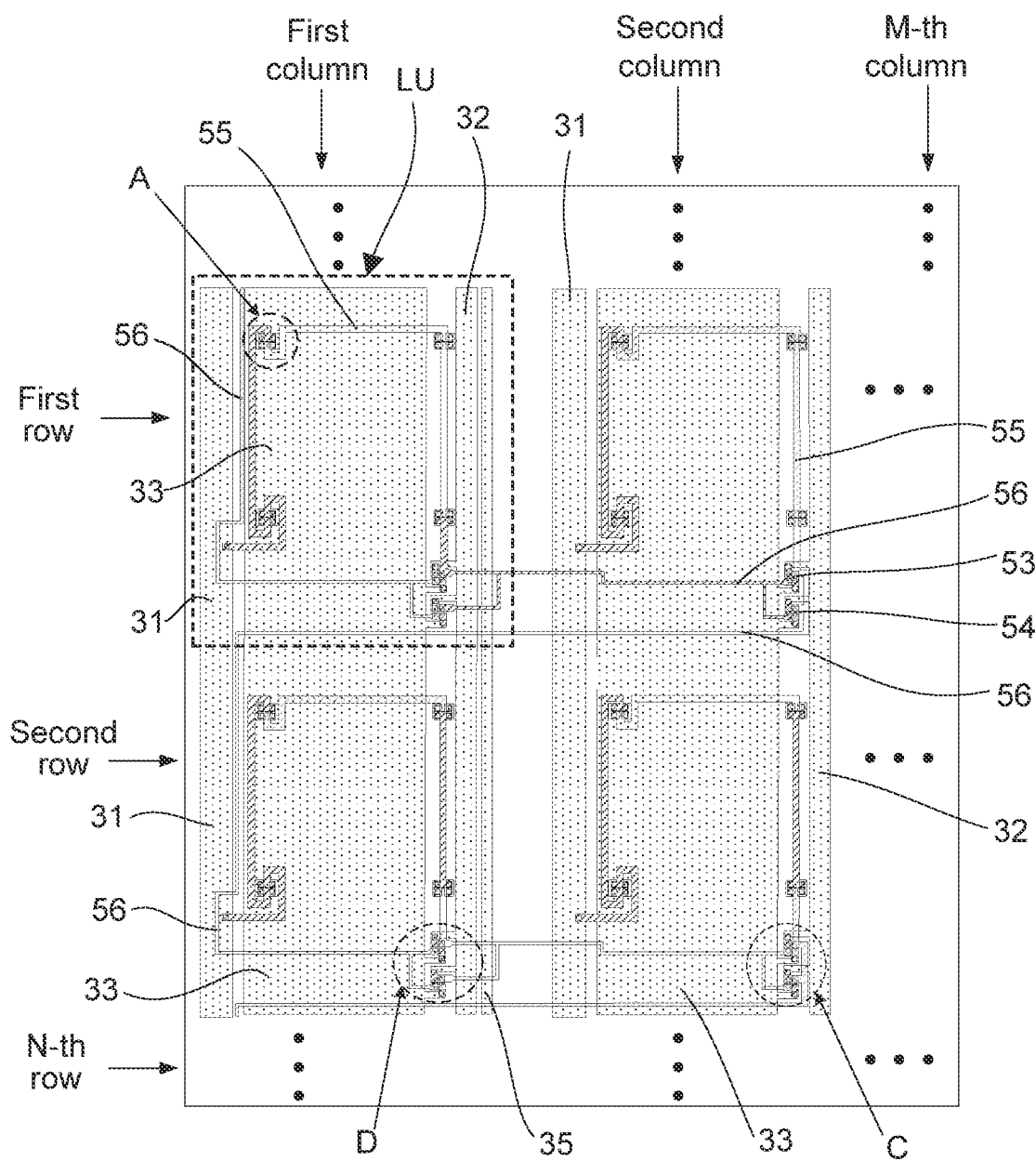
FIG. 9 is a diagram showing a connection structure of a plurality of light-emitting units in a light-emitting substrate, in accordance with embodiments of the present disclosure.

The light-emitting substrate 100 further includes a plurality of signal lines. For example, as shown in FIGS. 2B and 9, the light-emitting substrate 100 includes: at least one (e.g., one or a plurality of) source address line 35, at least one (e.g., one or a plurality of) source voltage line 32, at least one (e.g., one or a plurality of) driving voltage line 31, and at least one (e.g., one or a plurality of) common voltage line 33.

In some examples, the source address line 35, the source voltage line 32, the driving voltage line 31 and the common voltage line 33 may be disposed in the same layer (e.g., the first conductive layer 3).

Figure 10:
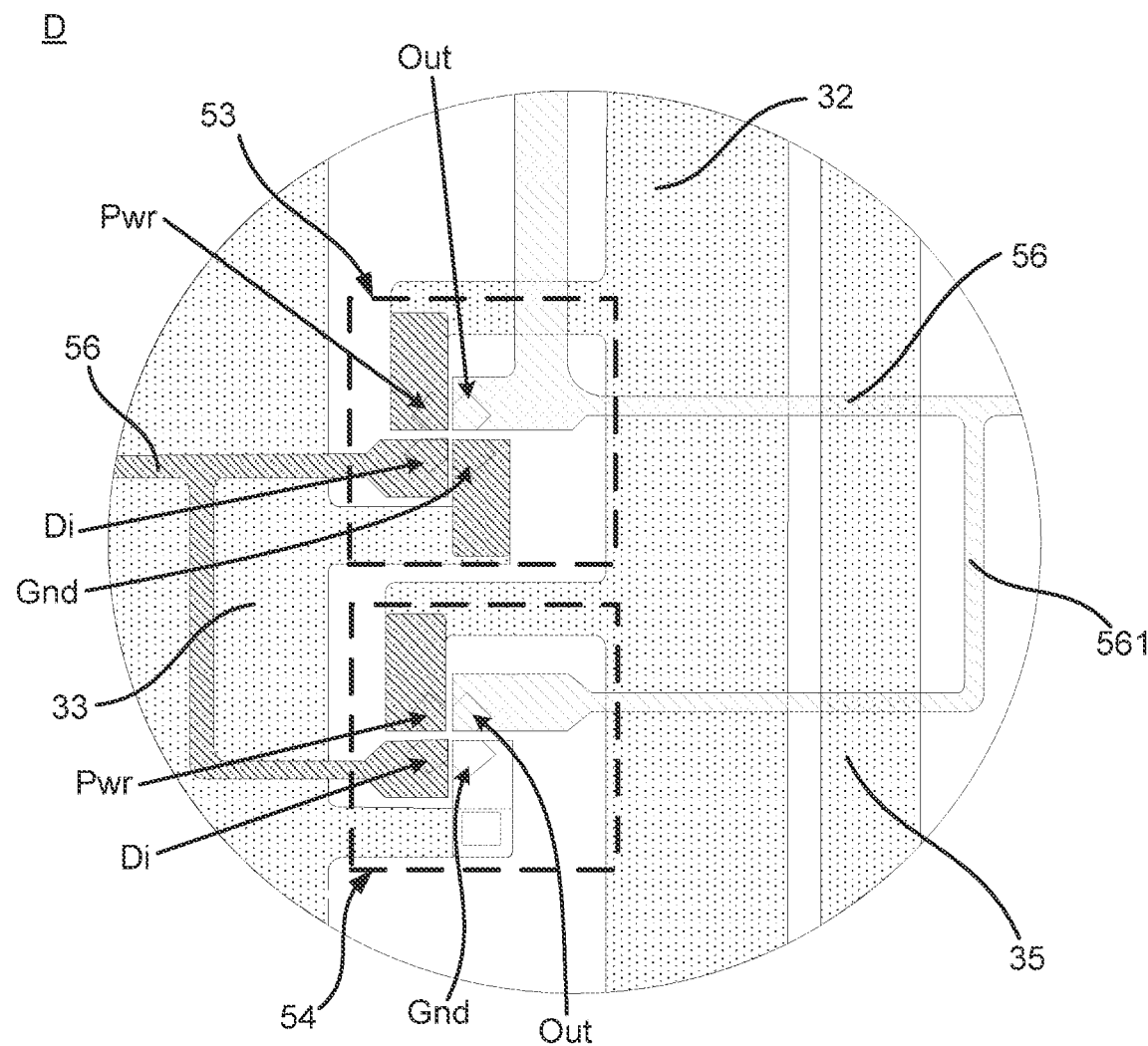
FIG. 10 is an enlarged view of the portion D in the light-emitting substrate shown in FIG. 9, in accordance with embodiments of the present disclosure.
Figure 11:
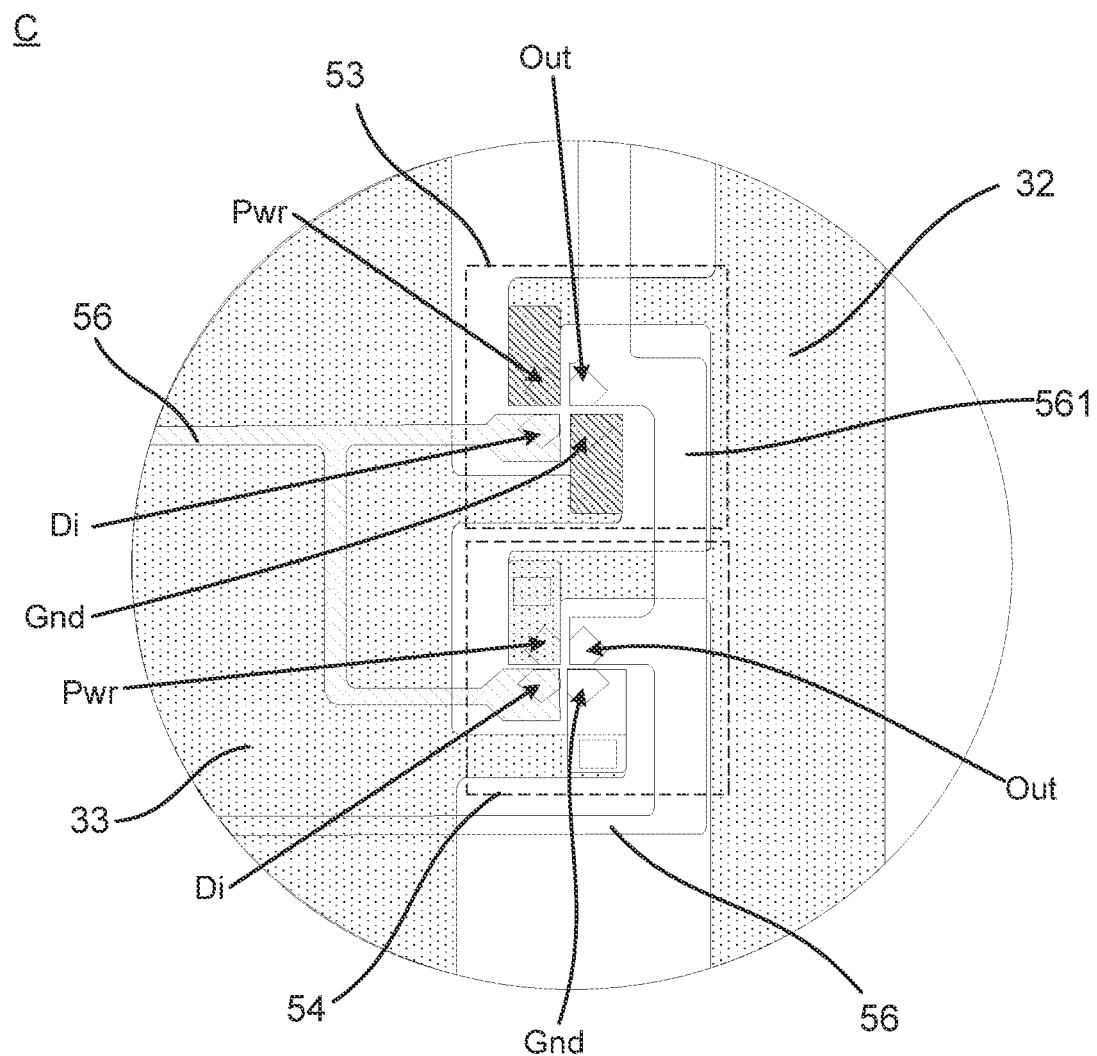
FIG. 11 is an enlarged view of the portion C in the light-emitting substrate shown in FIG. 9, in accordance with embodiments of the present disclosure.

As shown in FIGS. 10 and 11, in the light-emitting unit LU, the driving voltage terminal Vled is coupled to a driving voltage line 31. In the main driver chip pad group 53 and the spare driver chip pad group 54, the two first input pads Di are both coupled to a source address line 35 or output pads Out of another light-emitting unit, the two second input pads Pwr are both coupled to a source voltage line 32, the two output pads Out are both coupled to the main light-emitting element pad group 51 of the light-emitting unit LU and first input pads Di of the another light-emitting unit, and the two common voltage pads Gnd are both coupled to a common voltage line 33.

The source address line 35 is configured to transmit first input signals. The source address line 35 may be coupled to two first input pads Di of a first light-emitting unit in some (at least two) light-emitting units LU connected in series. Two output pads Out of each of the light-emitting units LU except a last light-emitting unit are coupled to two first input pads Di of a next light-emitting unit. Two output pads Out of the last light-emitting unit in the light-emitting units LU may be coupled to a signal output terminal to form a loop. In addition, the two output pads Out of each of the light-emitting units LU are coupled to the main light-emitting element pad group 51 and the spare light-emitting element pad group 52 of the light-emitting unit, so as to transmit driving signals to the plurality of light-emitting elements connected in series installed on the light-emitting unit LU.

The source voltage line 32 is configured to transmit second input signals. For example, each source voltage line 32 is coupled to at least one light-emitting unit (i.e., one or a plurality of light-emitting units, e.g., a column of light-emitting units) LU, and provides second input signal to second input pad(s) Pwr in light-emitting unit(s) coupled thereto.

The driving voltage line 31 is configured to transmit driving voltages. For example, each driving voltage line 31 is coupled to at least one light-emitting unit (i.e., one or a plurality of light-emitting units, e.g., a column of light-emitting units) LU, and provides driving voltage to light-emitting unit(s) coupled thereto. The driving voltage terminal of each light-emitting unit may be a portion of a driving voltage line 31 at a position where the driving voltage line 31 is coupled to the light-emitting unit.

The common voltage line 33 is configured to transmit common voltages. For example, each common voltage line 33 is coupled to at least one light-emitting unit (i.e., one or a plurality of light-emitting units, e.g., a column of light-emitting units) LU, and provides common voltage to common voltage pad(s) Gnd in light-emitting unit(s) coupled thereto. The common voltage is, for example, a ground signal.

In some embodiments, FIG. 9 shows a connection structure of the plurality of light-emitting units LU in the light-emitting substrate 100; FIG. 10 is an enlarged view of the portion D in the light-emitting substrate shown in FIG. 9; FIG. 11 is an enlarged view of the portion C in the light-emitting substrate shown in FIG. 9. Referring to FIGS. 9, 10 and 11, the light-emitting substrate includes a plurality of source address lines 35. The plurality of light-emitting units LU constitute a plurality of light-emitting unit groups, and a light-emitting unit group includes at least two light-emitting units LU and a plurality of second lines 56. For example, the light-emitting substrate 100 includes N rows and M columns of light-emitting units LU, and the light-emitting units LU in each light-emitting unit group are arranged in K1 rows and K2 columns. That is, each light-emitting unit group includes K1 rows and K2 columns of light-emitting units LU. K1 is greater than 0 and is less than or equal to N, and K1 is an integer, K2 is greater than 0 and is less than or equal to M, and K2 is an integer. For example, K1 is equal to N (K1=N), and K2 is equal to 2 (K2=2). That is, every two columns of light-emitting units LU constitute a light-emitting unit group. For example, first and second columns of light-emitting units LU in FIG. 9 constitute a light-emitting unit group.

In some examples, the plurality of light-emitting unit groups are coupled to the plurality of source address lines 35 in one-to-one correspondence. For example, as shown in FIG. 9, in a light-emitting unit group, main driver chip pad groups 53 are sequentially connected in series through a plurality of second lines 56, and according to a sequence of the serial connection, except a last main driver chip pad group 53, an output pad Out of each remaining main driver chip pad group 53 is coupled to a first input pad Di of a next main driver chip pad group 53, and a first input pad Di of a first main driver chip pad group is coupled to a source address line 35. In addition, since each main driver chip pad group 53 may be connected in parallel with a spare driver chip pad group 54, spare driver chip pad groups 54 in the light-emitting unit group are also connected in series in the sequence in which the main driver chip pad groups 53 are connected in series.

For example, in the light-emitting unit group, the K1 rows and K2 columns of light-emitting units are sequentially numbered according to row-column distribution positions. First input pads Di of a main driver chip pad group 53 and a spare driver chip pad group 54 of a light-emitting unit numbered 1 (denoted as LU(1)) are coupled to a source address line 35 corresponding to the light-emitting unit group. Output pads Out of a main driver chip pad group 53 and a spare driver chip pad 54 of a light-emitting unit numbered Q (denoted as LU(Q)) are coupled to first input pads Di of a main driver chip pad group 53 and a spare driver chip pad 54 of a light-emitting unit numbered (Q+1) (denoted as LU(Q+1)) through second lines 56. A driver chip (a driver chip installed on the main driver chip pad group 53 or the spare driver chip pad group 54 of the light-emitting unit LU(Q+1)) coupled to the light-emitting unit LU(Q+1) receives a relay signal output by an output pad Out connected to a driver chip (a driver chip installed on the main driver chip pad group 53 or the spare driver chip pad group 54 of the light-emitting unit LU(Q)) coupled to the light-emitting unit LU (Q)) through a first input pad Di connected to the driver chip as a first input signal. Q is greater than 0 and is less than a product of K1 and K2, and P is an integer. That is, the light-emitting unit LU (Q) is any light-emitting unit in the K1 rows and K2 columns of light-emitting units except the first and last light-emitting units.

Through the above connection method, in each light-emitting unit group, first input pads Di of a main driver chip pad group 53 and a spare driver chip pad group 54 of a first light-emitting unit are coupled to a source address line 35, and a driver chip coupled to each remaining light-emitting unit receives a relay signal output by a driver chip coupled to a previous light-emitting unit through a second line 56 as a first input signal. Therefore, for a light-emitting unit group, only by providing a first input signal (i.e., an address signal) through a source address line 35, all light-emitting units in the light-emitting unit group may obtain respective address signals. This greatly reduces the number of the source address lines 35, saves a wiring space, and simplifies a control method.

In the light-emitting unit group, the K1 rows and K2 columns of light-emitting units are sequentially numbered row by row and column by column in a zigzag shape. Of course, a way in which the light-emitting units are sequentially numbered according to the row-column distribution positions is not limited thereto, and the light-emitting units may also be numbered in other ways, so that the connection method of the plurality of light-emitting units may be flexibly adjusted, which is not limited herein.

In some examples, referring to FIGS. 10 and 11, a second line 56 is coupled to two output pads Out in a light-emitting unit. The second line 56 includes a parallel portion 561, which is a portion of the second line 56 extending substantially in an arrangement direction of the two output pads Out in the light-emitting unit. Orthogonal projections of the parallel portion 561 and a source voltage line 32 coupled to two second input pads Pwr of the light-emitting unit may not overlap, so that capacitance generated between the second line 56 and the source voltage line 32 may be reduced, and signal interference therebetween may be reduced. As an example, referring to FIG. 10, the parallel portion 561 is located at a side of the source voltage line 32 away from the two output pads Out in the light-emitting unit. As another example, referring to FIG. 11, the parallel portion 561 is located at a side of the source voltage line 32 close to the two output pads Out in the light-emitting unit.

In some embodiments, the light-emitting substrate 100 further includes a plurality of address signal transmission lines (not shown in the figure) configured to transmit first input signals. Each address signal transmission line couples a source address line 35 to first input pads Di of a main driver chip pad group 53 and a spare driver chip pad 54 of a first light-emitting unit LU(1) in a light-emitting unit group corresponding to the source address line 35. In this case, the plurality of address signal transmission lines, the plurality of light-emitting unit groups, and the plurality of source address lines are arranged in one-to-one correspondence, and each source address line 35 transmits a first input signal to a first light-emitting unit in a light-emitting unit group through an address signal transmission line.

In some examples, the source address line 35 and the main driver chip pad group 53 and the spare driver chip pad group 54 in the light-emitting unit LU(1) are located in two different conductive layers. For example, the source address line 35 is located in the first conductive layer 3, and the main driver chip pad group 53 and the spare driver chip pad group 54 in the light-emitting unit LU(1) are located in the second conductive layer 5. The address signal transmission line may be located in a same conductive layer as the main driver chip pad group 53 and the spare driver chip pad group 54 in the light-emitting unit LU(1). An end of the address signal transmission line is coupled to the two first input pads Di in the light-emitting unit LU(1), and the other end penetrates the insulating layer (e.g., the first insulating layer 4 in FIG. 7B) between the two conductive layers to be coupled to the source address line 35. That is, the address signal transmission line is coupled to the source address line 35 through a vis hole provided in the insulating layer.

Figure 12:
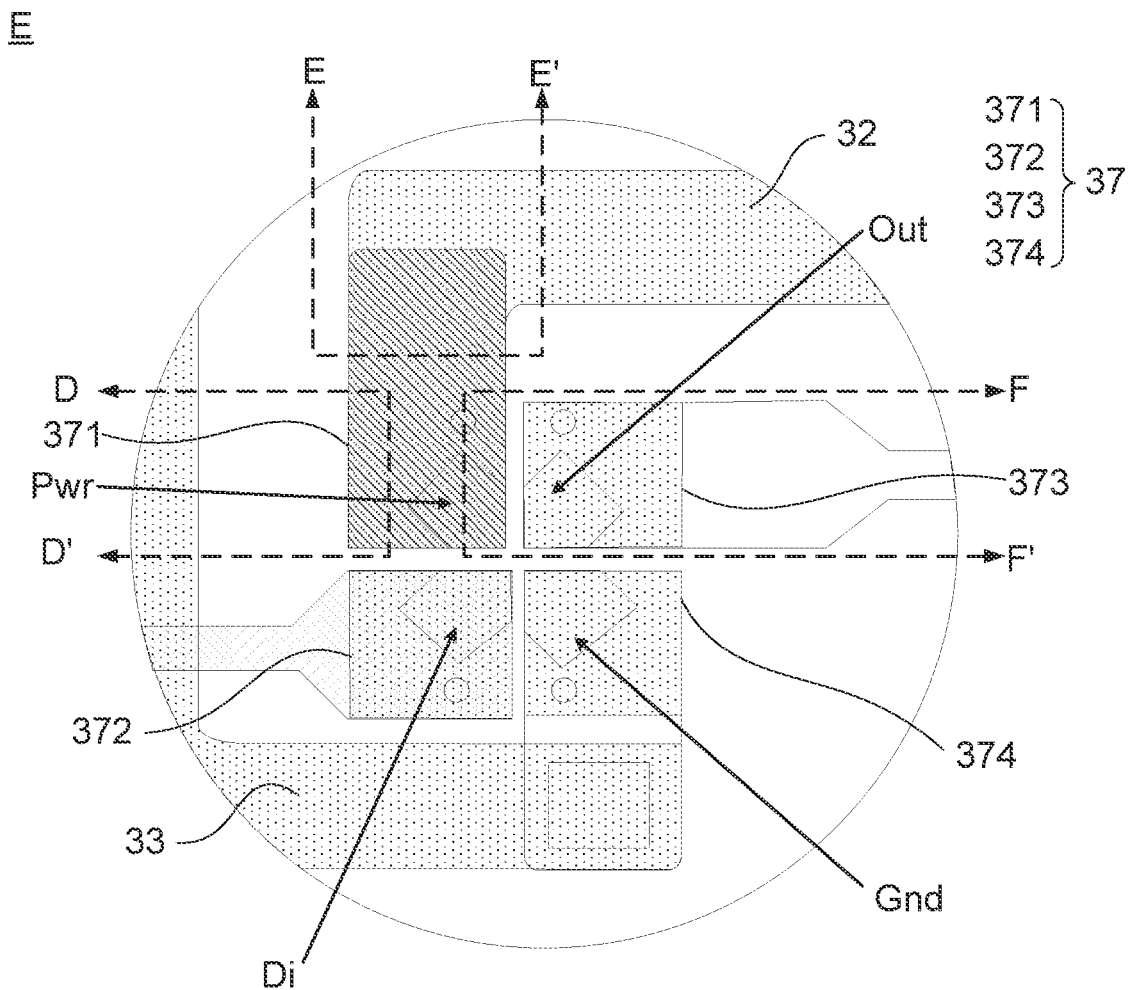
FIG. 12 is an enlarged view of the portion E in the light-emitting substrate shown in FIG. 2B, in accordance with embodiments of the present disclosure.
Figure 13A:
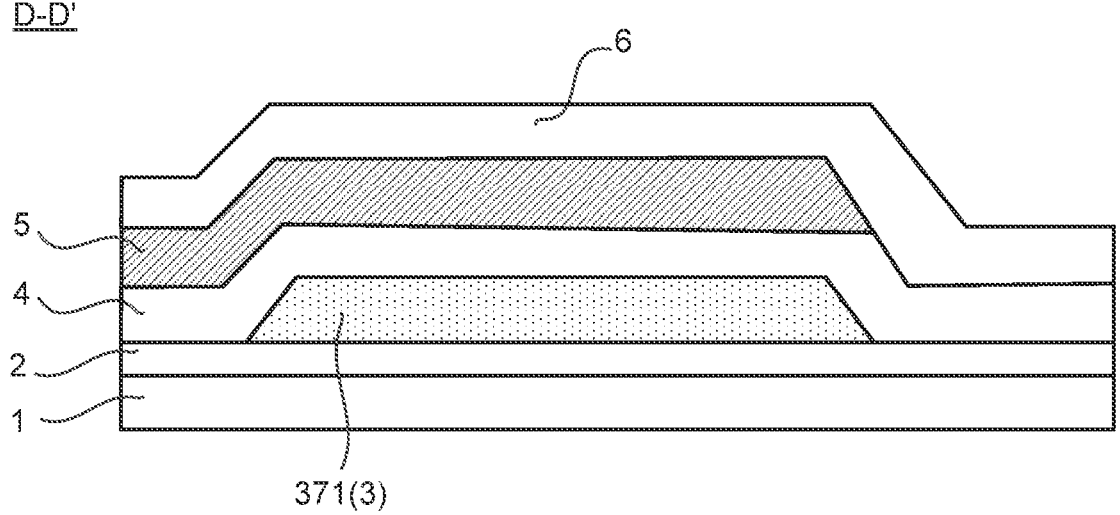
FIG. 13A is a sectional view of the light-emitting substrate taken along the line D-D' shown in FIG. 12, in accordance with embodiments of the present disclosure.
Figure 13B:
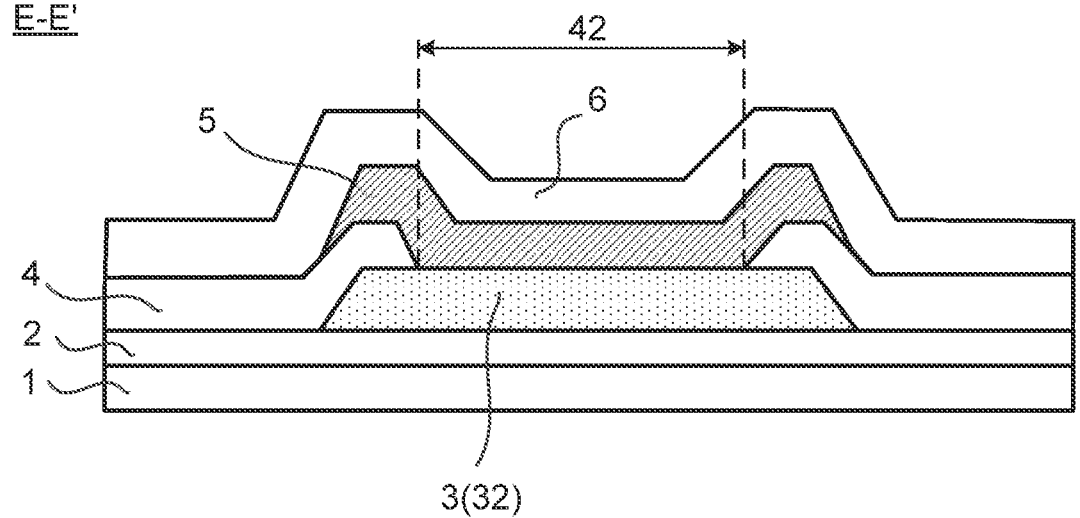
FIG. 13B is a sectional view of the light-emitting substrate taken along the line E-E' shown in FIG. 12, in accordance with embodiments of the present disclosure.
Figure 13C:
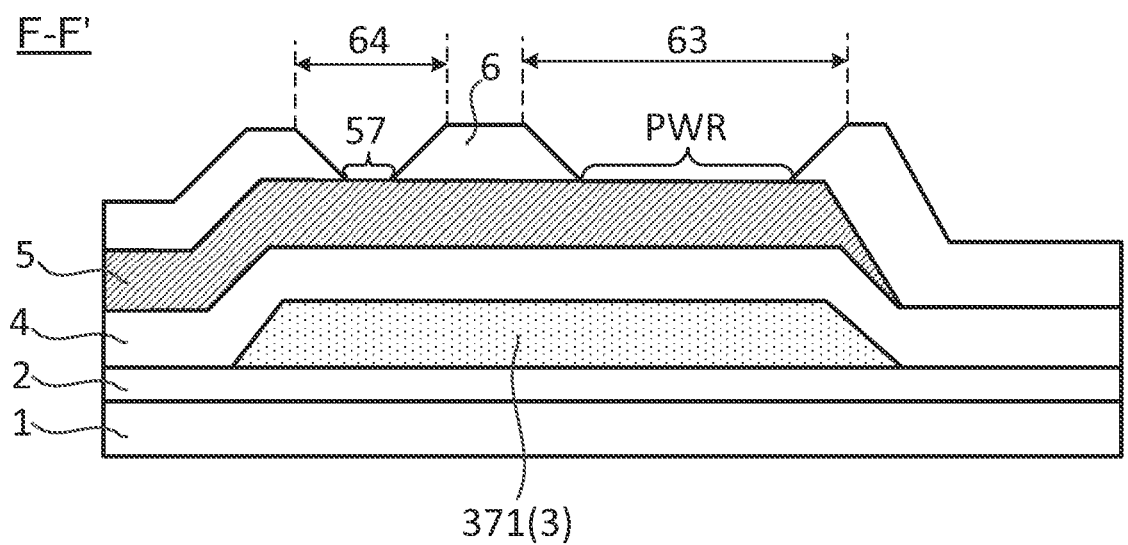
FIG. 13C is a sectional view of the light-emitting substrate taken along the line F-F' shown in FIG. 12, in accordance with embodiments of the present disclosure.

In some embodiments, FIG. 12 is an enlarged view of the portion E in the light-emitting substrate shown in FIG. 2B; FIG. 13A is a sectional view of the light-emitting substrate taken along the line D-D' shown in FIG. 12; FIG. 13B is a sectional view of the light-emitting substrate taken along the line E-E' shown in FIG. 12; FIG. 13C is a sectional view of the light-emitting substrate taken along the line F-F' shown in FIG. 12. The light-emitting substrate 100 further includes at least one (one or a plurality of) third support pad (which may also be referred to as a third support pattern). A third support pad is located on a side (e.g., right under) of a main driver chip pad group 53 or a spare driver chip pad group 54 close to the base. For each light-emitting unit, a third support pad may be disposed under only the main driver chip pad group 53 or the spare driver chip pad group 54, or may be disposed under each of the main driver chip pad group 53 and the spare driver chip pad group 54. Each third support pad includes a plurality of third sub-patterns (which may be referred to as third support plates) separated from each other. For example, as shown in FIG. 12, a third support pad 37 is disposed under a spare driver chip pad group 54, and the third support pad 37 includes four third sub-patterns 371, 372, 373 and 374. Orthogonal projections of pads (e.g., four pads) included in the spare driver chip pad group 54 above the third support pad on the base 1 are within orthogonal projections of third sub-patterns 371 to 374 in the third support pad 37 on the base 1. For another example, a third support pad 37 is disposed under a main driver chip pad group 53, and the third support pad 37 includes four third sub-patterns. Orthogonal projections of pads (e.g., four pads) included in the main driver chip pad group 53 above the third support pad on the base 1 are within orthogonal projections of third sub-patterns in the third support pad on the base 1.

In some possible implementations, the third support pad 37 may be located in a same conductive layer as the source address line 35, the source voltage line 32, the driving voltage line 31 and the common voltage line 33. For example, as shown in FIGS. 13A, 13B and 13C, the third support pad 37 is disposed in the first conductive layer 3 as the source voltage line 32. Therefore, the third support pad 37, the source address line 35, the source voltage line 32, the driving voltage line 31 and the common voltage line 33 may be manufactured through, for example, a patterning process (e.g., a photolithography process), so that a manufacturing process may be simplified. Moreover, by providing the third support pad 37, it may be possible to reduce steps between both the pads of the main driver chip pad group 53 and the pads of the spare driver chip pad group 54 and a position in an upper surface of the light-emitting substrate that is farthest away from the base, and to reduce difficulty of installing the driver chip 300 and other manufacturing processes subsequently.

For example, hereinafter, any pad in the main driver chip pad group 53 or the spare driver chip pad group 54 that needs to be connected to a corresponding signal line in the first conductive layer 3 is referred to as a first pad. For example, a second input terminal Pwr needs to be coupled to a source voltage line 32, and a common voltage terminal Gnd needs to be coupled to a common voltage line 33, thus each of the second input terminal Pwr and the common voltage terminal Gnd is referred to as a first pad. Therefore, the main driver chip pad group 53 or the spare driver chip pad group 54 may include two first pads. The first insulating layer 4 may be provided with a plurality of second via holes 42, and each first pad may be electrically connected to a corresponding signal line in the first conductive layer 3 through at least one corresponding second via hole 42. For example, the second input terminals Pwr in the main driver chip pad group 53 and the spare driver chip pad group 54 are located in the second conductive layer 5, and the source voltage line 32 is located in the first conductive layer 3. In this case, as shown in FIG. 13B, a pattern where the second input terminal Pwr in the spare driver chip pad group 54 is located penetrates a second via hole 42 to be coupled to the source voltage line 32. Of course, a pattern where the second input terminal Pwr in the main driver chip pad group 53 is located also penetrates a second via hole 42 to be coupled to the source voltage line 32. For another example, a pattern where the common voltage terminal Gnd in the main driver chip pad group 53 or the spare driver chip pad group 54 is located penetrates a second via hole 42 to be coupled to the common voltage line 33.

Further, in the main driver chip pad group 53 or the spare driver chip pad group 54, a third sub-pattern under a first pad and a signal line coupled to the first pad may be located in a same conductive layer (e.g., the first conductive layer 3), and they may not be in contact. For example, referring to FIG. 12, in the spare driver chip pad group 54, the third sub-pattern 371 under the second input terminal Pwr is not in contact with the source voltage line 32. In this case, reliability of connection between a pattern where the second input terminal Pwr is located and the source voltage line 32 may be detected at the second input terminal Pwr. Even if the second input terminal Pwr is pricked during the detection to connect the second input terminal Pwr to the third sub-pattern 371, a test result is not affected.

For another example, the second insulating layer 6 may be provided with a plurality of third via holes, and a portion of the second conductive layer 5 exposed by a third via hole is used as a pad in the main driver chip pad group 53 or the spare driver chip pad group 54. For example, as shown in FIG. 13C, a portion of the second conductive layer 5 exposed by a third via hole 63 is used as the second input terminal Pwr in the spare driver chip pad group 54.

For yet another example, the second insulating layer 6 may further be provided with a plurality of fourth via holes, as shown in FIG. 13C, a portion of the second conductive layer 5 exposed by a fourth via hole 64 is used as a test point 57. In this way, during a subsequent test, the test may be performed through the exposed test point 57, which does not cause adverse effect such as pricking of a pad in the main driver chip pad group 53 or the spare driver chip pad group 54. In addition, in some possible implementations, since the main driver chip pad group 53 may not be used for the subsequent test, a test point 57 is only disposed corresponding to a pad in a spare driver chip pad group 54.

Figure 14:
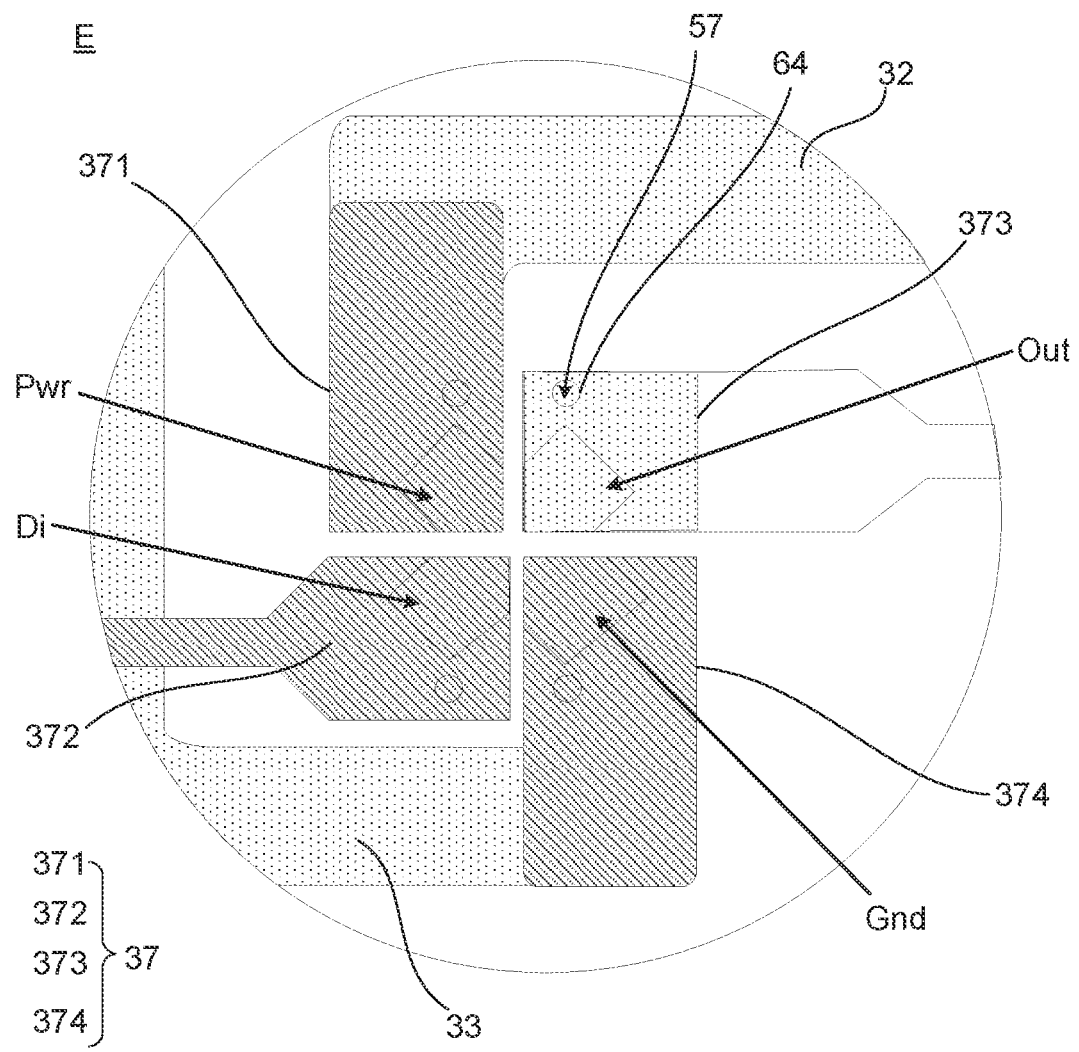
FIG. 14 is an enlarged view of the portion E in the light-emitting substrate shown in FIG. 2B, in accordance with embodiments of the present disclosure.

In some other embodiments, FIG. 14 is an enlarged view of the portion E in the light-emitting substrate shown in FIG. 2B. Referring to FIG. 14, the third support pads 37 includes four third sub-patterns 371, 372, 373 and 374, and the positional relationship between the third support pad 37 and the spare driver chip pad group 54 may be obtained by referring to the description in the embodiments corresponding to FIG. 12. A difference from FIG. 12 is that in these embodiments, a third sub-pattern 37 under a first pad and a signal line coupled to the first pad may be located in the same conductive layer (e.g., the first conductive layer 3), and they may be in contact. For example, as shown in FIG. 14, in the spare driver chip pad group 54, the third sub-pattern 371 under the second input terminal Pwr is in contact with the source voltage line 32 to form an integral pattern, so that in a case where the second input terminal Pwr and the source voltage line 32 are open-circuited due to that there is a problem with the second via hole 42 through which the second input terminal Pwr is coupled to the source voltage line 32, repair may be performed through, for example, a laser welding process in an overlapping region of the pattern where the second input terminal Pwr is located and the source voltage line 32.

In some embodiments, the light-emitting element 200 may be an LED or a micro LED. In this case, the main light-emitting element pad group 51 is referred to as a main LED pad group, and the spare light-emitting element pad group 52 is also referred to as a spare LED pad group.

In some embodiments, the driver chip 300 is a DDIC. In this case, the main driver chip pad group is referred to as a main DDIC pad group, and the spare driver chip pad group is also referred to as a spare DDIC pad group.

Some embodiments of the present disclosure provide a display apparatus. The display apparatus refers to a product with an image display function. For example, it may be any one of a display, a television, a billboard, a digital photo frame, a laser printer with a display function, a telephone, a mobile phone, a tablet computer, a personal digital assistant (PDA), a digital camera, a portable camcorder, a viewfinder, a monitor, a vehicle-mounted screen, a navigator, a vehicle, a large-area wall, a home appliance, an information inquiry device (e.g., an inquiry device for business in a department such as an electronic government (e-government), a bank, a hospital or a power department), or the like.

Figure 15:
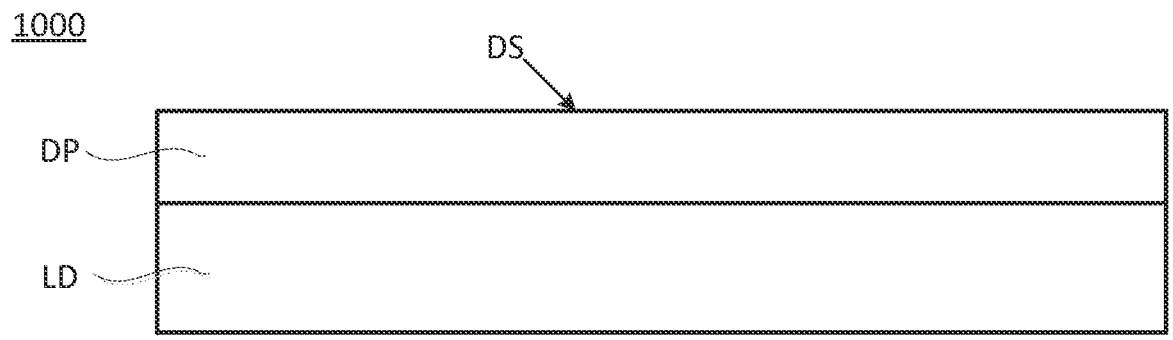
FIG. 15 is a diagram showing a structure of a display apparatus, in accordance with embodiments of the present disclosure.

Referring to FIG. 15, the display apparatus 1000 includes a display panel DP and a light-emitting apparatus LD. The display panel DP may be a liquid crystal display panel. The light-emitting apparatus LD may be the light-emitting apparatus provided by any one of the above embodiments. The light-emitting apparatus is located on a side of the display panel DP away from a display side, and is configured to provide backlight to the display panel DP.

Beneficial effects of the display apparatus provided by these embodiments are the same as those of the light-emitting substrate or the light-emitting apparatus provided by the above embodiments, and details will not be repeated herein.

Some embodiments of the present disclosure provide a method for manufacturing a light-emitting substrate. The light-emitting substrate may be the light-emitting substrate provided by any one of the above embodiments. The method for manufacturing the light-emitting substrate includes: providing a plurality of light-emitting units on a base. A light-emitting unit includes a driving voltage terminal, a main driver chip pad group, a plurality of main light-emitting element pad groups connected in series, and at least one spare light-emitting element pad group; both ends of the plurality of main light-emitting element pad groups are coupled to the driving voltage terminal and the main driver chip pad group; each spare light-emitting element pad group is connected in parallel with one of the plurality of main light-emitting element pad groups to constitute a pad unit.

In some embodiments, the method for manufacturing the light-emitting substrate may include the following steps.

In S101, a buffer layer is formed on the base through, for example, a deposition process.

In S102, a first conductive layer 3 is formed on the base.

Figure 16A:
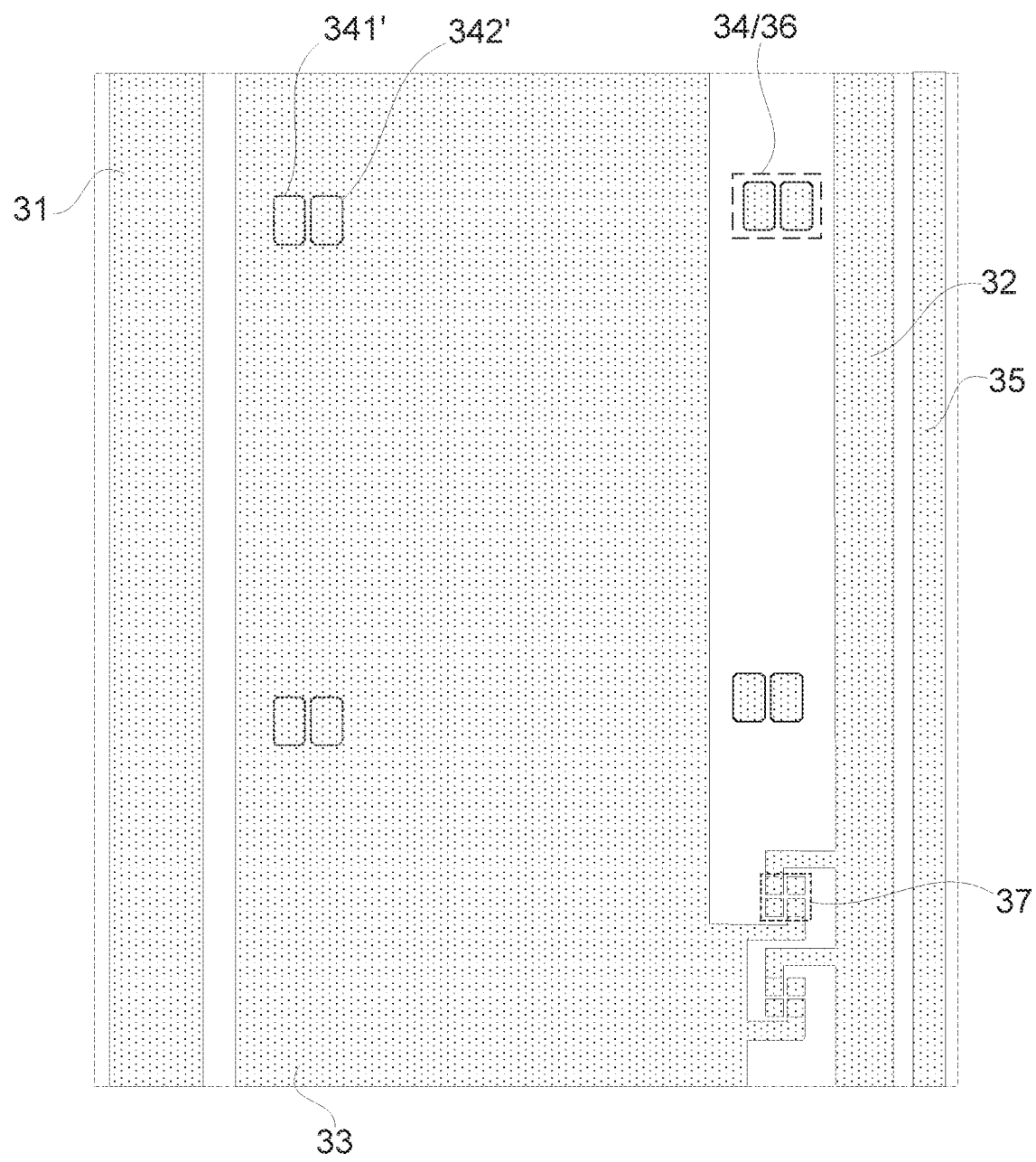
FIGS. 16A to 16D are diagrams showing a manufacturing processes of a light-emitting substrate, in accordance with embodiments of the present disclosure.

Referring to FIG. 16A, the first conductive layer 3 may include source address lines 35, source voltage lines 32, driving voltage lines 31, and common voltage lines 33. FIG. 16A only shows portions of the source address lines 35, source voltage lines 32, driving voltage lines 31, and common voltage lines 33. The first conductive layer 3 may further include first support pads 34 or second support pads 36 (FIG. 16 shows an embodiment in which the base includes only the first support pads 34), and third support pads 37.

For example, a conductive film may be first deposited on the base on which the buffer layer has been formed, and then the conductive film is patterned to form the first conductive layer 3.

In S103, a first insulating layer 4 is formed on a side of the first conductive layer 3 away from the base.

Figure 16B:
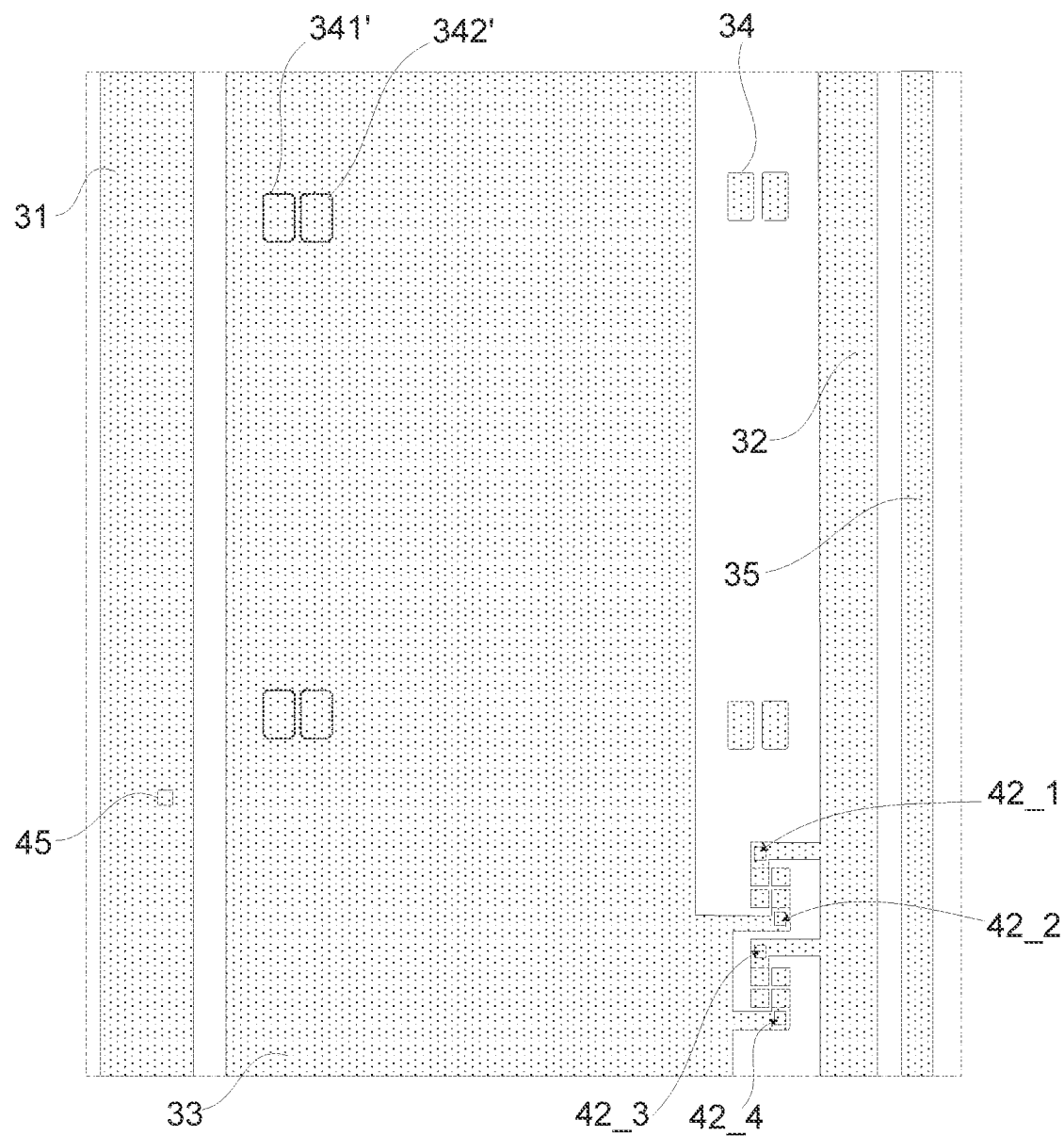

The first insulating layer 4 may be provided with a plurality of second via holes 42 and a plurality of fifth via holes 45. For example, as shown in FIG. 16B, there are two second via holes 42_1 and 42_2 in the first insulating layer 4 corresponding to the main driver chip pad group 53, in which one second via hole 42_1 exposes a source voltage line 32, and the other via hole 42_2 exposes a common voltage line 33; there are two second via holes 42_3 and 42_4 in the first insulating layer 4 corresponding to the spare driver chip pad group 54, in which one second via hole 42_3 exposes a source voltage line 32, and the other via hole 42_4 exposes a common voltage line 33. A portion of the driving voltage line exposed by a fifth via hole 45 are used as a driving voltage terminal in a light-emitting unit LU.

In S104, a second conductive layer 5 is formed on a side of the first insulating layer 4 away from the base.

Figure 16C:
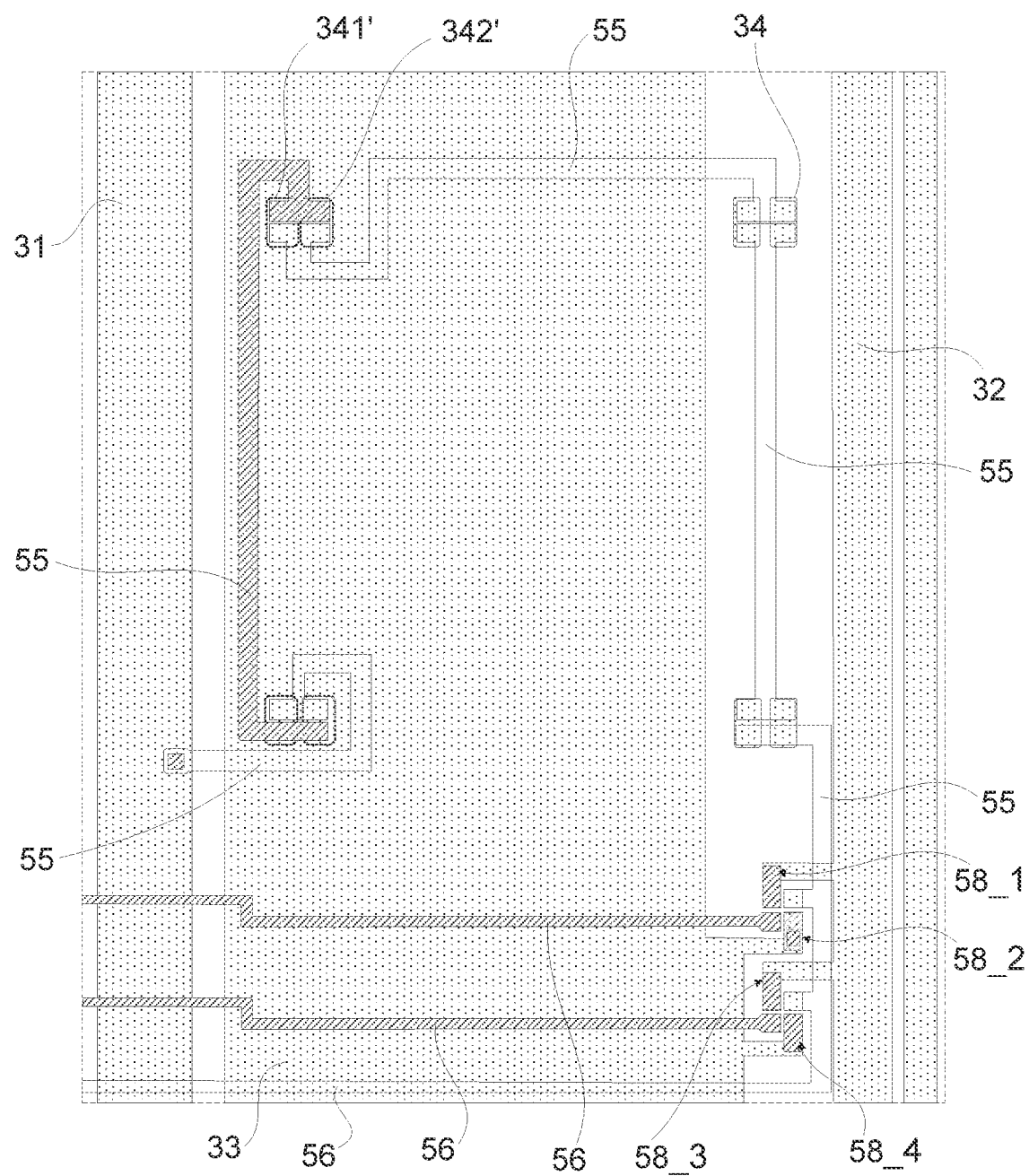

Referring to FIG. 16C, the second conductive layer 5 may include first lines 55, second lines 56, and patterns 58 where pads are located. The pads herein refer to pads in the main driver chip pad group 53 and the spare driver chip pad group. For example, in patterns 58_1 and 58_2 where two pads in a main driver chip pad group 53 are located, a pattern 58_1 where one pad is located is coupled to a source address line 32 through a second via hole 42_1, and a pattern 58_2 where the other pad is located is coupled to a common voltage line 33 through a second via hole 42_2; in patterns 58_3 and 58_4 where two pads in a spare driver chip pad group 54 are located, a pattern 58_3 where one pad is located is coupled to a source address line 32 through a second via hole 42_3, and a pattern 58_4 where the other pad is located is coupled to a common voltage line 33 through a second via hole 42_4.

A manufacturing process of the second conductive layer 5 may be similar to that of the first conductive layer 3, and will not be repeated herein.

In S105, a second insulating layer 6 is formed on a side of the second conductive layer 5 away from the base.

Figure 16D:
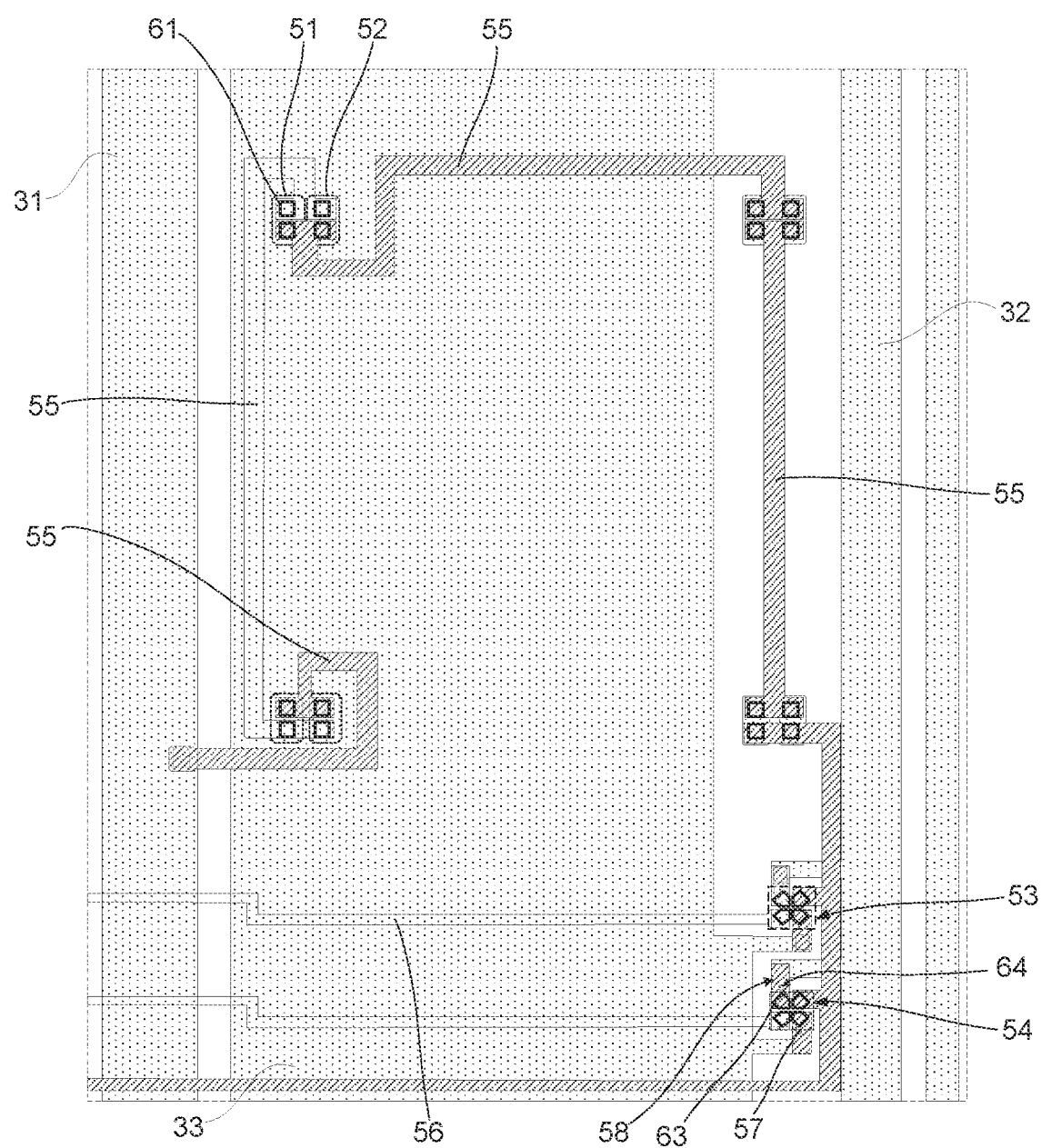

Referring to FIG. 16D, the second insulating layer 6 may be provided with a plurality of first via holes 61 and a plurality of third via holes 63, and may be further provided with a plurality of fourth via holes 64.

A (e.g., each) first via hole 61 is located at an end of a first line 55 to expose a pad in a main light-emitting element pad group 51 or a spare light-emitting element pad group 52.

A third via hole 63 is located at an end of a second line 56 or in a pattern 58 where a pad is located, so as to expose a pad in a main driver chip pad group 53 or a spare driver chip pad group 54.

A fourth via hole 64 may be located in a pattern 58 where a pad is located to expose, for example, a test point 57 in a spare driver chip pad group 54.

Beneficial effects of the light-emitting substrate provided by these embodiments are the same as those of the light-emitting substrate or the light-emitting apparatus provided by the above embodiments, and details will not be repeated herein.

In the description, the specific features, structures, materials or characteristics may be combined in any one or more embodiments or examples in a suitable manner.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A light-emitting substrate, comprising a base and a plurality of light-emitting units disposed on the base, a light-emitting unit including:
    a driving voltage terminal;
    a main driver chip pad group;
    a plurality of main light-emitting element pad groups connected in series, both ends of the plurality of main light-emitting element pad groups being coupled to the driving voltage terminal and the main driver chip pad group;
    at least one spare light-emitting element pad group, each spare light-emitting element pad group being connected in parallel with one of the plurality of main light-emitting element pad groups to constitute a pad unit; and
    a plurality of first lines, wherein the plurality of first lines are disposed between the driving voltage terminal and the main driver chip pad group, and sequentially connect the plurality of main light-emitting element pad groups; the plurality of first lines include two first lines connected to the main light-emitting element pad group in the pad unit, and the two first lines are a first connection line and a second connection line; wherein
    the main light-emitting element pad group and the spare light-emitting element pad group in the pad unit each includes an anode and a cathode, the anode pads of the spare light-emitting element pad group and the main light-emitting element pad group are both disposed on the first connection line, and the cathode pads of the spare light-emitting element pad group and the main light-emitting element pad group are both disposed on the second connection line.

2. The light-emitting substrate according to claim 1, wherein
    the at least one spare light-emitting element pad group includes a plurality of spare light-emitting element pad groups, and the plurality of spare light-emitting element pad groups and respective main light-emitting element pad groups connected in parallel therewith constitute a plurality of pad units.

3. The light-emitting substrate according to claim 2, wherein
    according to a connection sequence of the plurality of pad units in the light-emitting unit, in two adjacent pad units, a distance between two main light-emitting element pad groups and a distance between two spare light-emitting element pad groups are approximately equal.

4. The light-emitting substrate according to claim 1, wherein
    a main light-emitting element pad group includes an anode pad and a cathode pad arranged in a first direction, a spare light-emitting element pad group includes an anode pad and a cathode pad arranged in the first direction;
    in the pad unit, the anode pads in the spare light-emitting element pad group and the main light-emitting element pad group are arranged in a second direction, and the cathode pads in the spare light-emitting element pad group and the main light-emitting element pad group are arranged in the second direction;
    the second direction intersects with the first direction.

5. The light-emitting substrate according to claim 1, wherein
    in the pad unit, the anode pads of the main light-emitting element pad group and the spare light-emitting element pad group are both disposed at an end of the first connection line, and the end of the first connection line extends from an anode pad to another anode pad in the pad unit; and/or
    in the pad unit, the cathode pads of the main light-emitting element pad group and the spare light-emitting element pad group are both disposed at an end of the second connection line, and the end of the second connection line extends from a cathode pad to another cathode pad in the pad unit.

6. The light-emitting substrate according to claim 1, wherein
    an end of the first connection line is divided into a first pattern and a second pattern that are sequentially arranged in an extension direction of the end of the first connection line, a width of the second pattern is greater than a width of the first pattern, each of the widths of the first pattern and the second pattern is a dimension of the first pattern and the second pattern in a direction perpendicular to the extension direction of the end of the first connection line; the anode pads of the spare light-emitting element pad group and the main light-emitting element pad group in the pad unit are both disposed on the second pattern, an arrangement direction thereof is substantially perpendicular to the extension direction of the end of the first connection line, and they are located on both sides of a center line of the first pattern; the center line of the first pattern is parallel to the extension direction of the end of the first connection line, and is at a same distance from the two side faces of the first pattern; and/or
    an end of the second connection line is divided into a third pattern and a fourth pattern that are sequentially arranged in an extension direction of the end of the second connection line, a width of the fourth pattern is greater than a width of the third pattern, each of the widths of the third pattern and the fourth pattern is a dimension of the third pattern and the fourth pattern in a direction perpendicular to the extension direction of the end of the second connection line; the cathode pads of the spare light-emitting element pad group and the main light-emitting element pad group in the pad unit are both disposed on the fourth pattern, an arrangement direction thereof is substantially perpendicular to the extension direction of the end of the second connection line, and they are located on both sides of a center line of the third pattern; the center line of the third pattern is parallel to the extension direction of the end of the second connection line, and is at a same distance from the two side faces of the third pattern.

7. The light-emitting substrate according to claim 6, wherein
the end of the first connection line is divided into the first pattern and the second pattern that are sequentially arranged in the extension direction of the end of the first connection line, the width of the second pattern is greater than the width of the first pattern, each of the widths of the first pattern and the second pattern is the dimension of the first pattern and the second pattern in the direction perpendicular to the extension direction of the end of the first connection line; the anode pads of the spare light-emitting element pad group and the main light-emitting element pad group in the pad unit are both disposed on the second pattern, the arrangement direction thereof is substantially perpendicular to the extension direction of the end of the first connection line, and they are located on both sides of the center line of the first pattern; the center line of the first pattern is parallel to the extension direction of the end of the first connection line, and is at a same distance from the two side faces of the first pattern;
the anode pads of the spare light-emitting element pad group and the main light-emitting element pad group in the pad unit are symmetrically arranged with respect to the center line of the first pattern.

8. The light-emitting substrate according to claim 6, wherein
the end of the second connection line is divided into the third pattern and the fourth pattern that are sequentially arranged in the extension direction of the end of the second connection line, the width of the fourth pattern is greater than the width of the third pattern, each of the widths of the third pattern and the fourth pattern is a dimension of the third pattern and the fourth pattern in the direction perpendicular to the extension direction of the end of the second connection line; the cathode pads of the spare light-emitting element pad group and the main light-emitting element pad group in the pad unit are both disposed on the fourth pattern, the arrangement direction thereof is substantially perpendicular to the extension direction of the end of the second connection line, and they are located on both sides of the center line of the third pattern; the center line of the third pattern is parallel to the extension direction of the end of the second connection line, and is at a same distance from the two side faces of the third pattern;
the cathode pads of the spare light-emitting element pad group and the main light-emitting element pad group in the pad unit are symmetrically arranged with respect to the center line of the third pattern.

9. The light-emitting substrate according to claim 1, wherein
the light-emitting substrate further comprises at least one first support pad, a first support pad is located on a side of the pad unit close to the base, and includes two first sub-patterns separated from each other; in the pad unit, an orthogonal projection of the main light-emitting element pad group on the base is within an orthogonal projection of a first sub-pattern in the first support pad on the base, and an orthogonal projection of the spare light-emitting element pad group on the base is within an orthogonal projection of another first sub-pattern in the first support pad on the base; or
the light-emitting substrate further comprises at least one second support pad, a second support pad is located on a side of the pad unit close to the base, and includes a plurality of second sub-patterns separated from each other; in the pad unit, orthogonal projections of pads included in the main light-emitting element pad group and the spare light-emitting element pad group on the base are within orthogonal projections of the plurality of second sub-patterns on the base in one-to-one correspondence.

10. The light-emitting substrate according to claim 1, wherein
the light-emitting unit further includes a spare driver chip pad group, and the main driver chip pad group and the spare driver chip pad group are connected in parallel.

11. The light-emitting substrate according to claim 10, wherein
the light-emitting substrate further comprises at least one source address line, at least one source voltage line, at least one driving voltage line, and at least one common voltage line;
a driving voltage line is coupled to the driving voltage terminal;
in the light-emitting unit, the main driver chip pad group and the spare driver chip pad group each include a first input pad, a second input pad, an output pad, and a common voltage pad; in the main driver chip pad group and the spare driver chip pad group, two first input pads are both coupled to a source address line or output pads of another light-emitting unit, two second input pads are both coupled to a source voltage line, two output pads are both coupled to the main light-emitting element pad group of the light-emitting unit and first input pads of the another light-emitting unit, and two common voltage pads are both coupled to a common voltage line.

12. The light-emitting substrate according to claim 11, wherein
the at least one source address line includes a plurality of source address lines;
the plurality of light-emitting units constitute a plurality of light-emitting unit groups, and a light-emitting unit group includes at least two light-emitting units and a plurality of second lines;
in the light-emitting unit group, main driver chip pad groups are sequentially connected in series through the plurality of second lines, and according to a sequence of the serial connection, except a last main driver chip pad group, an output pad of each remaining main driver chip pad group is coupled to a first input pad of a next main driver chip pad group; a first input pad of a first main driver chip pad group is coupled to a source address line.

13. The light-emitting substrate according to claim 12, wherein
the plurality of light-emitting units are arranged in N rows and M columns, and the light-emitting units in each light-emitting unit group are arranged in K1 rows and K2 columns;
N is an integer greater than 0, M is an integer greater than 0, K1 is greater than 0 and is less than or equal to N, and K1 is an integer, K2 is greater than 0 and is less than or equal to M, and K2 is an integer.

14. The light-emitting substrate according to claim 11, wherein
the at least one source address line, the at least one source voltage line, the at least one driving voltage line, and the at least one common voltage line are located in a first conductive layer;
the main light-emitting element pad group, the spare light-emitting element pad group, the main driver chip pad group, and the spare driver chip pad group are located in a second conductive layer; the first conductive layer is closer to the base than the second conductive layer.

15. The light-emitting substrate according to claim 10, wherein
the light-emitting substrate further comprises at least one third support pad, wherein a third support pad is located on a side of the main driver chip pad group or the spare driver chip pad group close to the base, and includes a plurality of third sub-patterns separated from each other; orthogonal projections of pads included in the main driver chip pad group or the spare driver chip pad group on the base are within orthogonal projections of the third sub-patterns in the third support pad on the base in one-to-one correspondence.

16. The light-emitting substrate according to claim 1, wherein
the main driver chip pad group is a main display driver integrated circuit (DDIC) pad group; the main light-emitting element pad group is a main light-emitting diode (LED) pad group; the spare light-emitting element pad group is a spare LED pad group.

17. A light-emitting apparatus, comprising:
the light-emitting substrate according to claim 1; and
a plurality of light-emitting elements disposed on the light-emitting substrate, each light-emitting element being coupled to a main light-emitting element pad group or a spare light-emitting element pad group on the light-emitting substrate.

18. A display apparatus, comprising:
a display panel; and
the light-emitting apparatus according to claim 17, the light-emitting apparatus being located on a side of the display panel facing away from a display surface.

19. A method for manufacturing a light-emitting substrate, the method comprising:
providing a plurality of light-emitting units on a base, wherein a light-emitting unit includes a driving voltage terminal, a main driver chip pad group, a plurality of main light-emitting element pad groups connected in series, at least one spare light-emitting element pad group, and a plurality of first lines; wherein both ends of the plurality of main light-emitting element pad groups are coupled to the driving voltage terminal and the main driver chip pad group; each spare light-emitting element pad group is connected in parallel with one of the plurality of main light-emitting element pad groups to constitute a pad unit; the plurality of first lines are disposed between the driving voltage terminal and the main driver chip pad group, and sequentially connect the plurality of main light-emitting element pad groups; the plurality of first lines include two first lines connected to the main light-emitting element pad group in the pad unit, and the two first lines are a first connection line and a second connection line; the main light-emitting element pad group and the spare light-emitting element pad group in the pad unit each includes an anode and a cathode, the anode pads of the spare light-emitting element pad group and the main light-emitting element pad group are both disposed on the first connection line, and the cathode pads of the spare light-emitting element pad group and the main light-emitting element pad group are both disposed on the second connection line.

* * * * *